(12) United States Patent
McFeely et al.

(10) Patent No.: US 6,655,590 B1
(45) Date of Patent: Dec. 2, 2003

(54) SMART CARD READER

(75) Inventors: Stephen McFeely, Renfrewshire (GB); Johan Teunissen, Valkenswaard (NL); Frank Van Meijl, Someren (NL)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/019,895

(22) PCT Filed: Jun. 30, 2000

(86) PCT No.: PCT/US00/18296
§ 371 (c)(1), (2), (4) Date: Mar. 25, 2002

(87) PCT Pub. No.: WO01/03052
PCT Pub. Date: Jan. 11, 2001

Related U.S. Application Data

(60) Provisional application No. 60/142,261, filed on Jul. 2, 1999, provisional application No. 60/159,027, filed on Oct. 12, 1999, and provisional application No. 60/190,771, filed on Mar. 20, 2000.

(51) Int. Cl.[7] ................................................. G06K 7/08
(52) U.S. Cl. ...................................... 235/451; 235/441
(58) Field of Search ................................. 235/451, 441

(56) References Cited

U.S. PATENT DOCUMENTS

| | | | |
|---|---|---|---|
| 4,735,578 A | 4/1988 | Reichardt et al. | |
| 4,752,234 A | 6/1988 | Reichardt et al. | |
| 4,909,742 A | 3/1990 | Ohkubo et al. | |
| 4,976,630 A | 12/1990 | Schuder et al. | |
| 5,176,523 A | 1/1993 | Lai | |
| 5,224,873 A | 7/1993 | Duffet et al. | |
| 5,225,653 A | 7/1993 | Martin et al. | |
| 5,252,815 A | 10/1993 | Pernet | |
| 5,395,259 A | 3/1995 | Casses | |
| 5,648,651 A | 7/1997 | Inoue | |
| 5,667,397 A | 9/1997 | Broschard, III et al. | |
| 6,169,257 B1 | 1/2001 | Bricaud et al. | |
| 6,503,092 B1 * | 1/2003 | Sato ............................ | 235/452 |

FOREIGN PATENT DOCUMENTS

| | | |
|---|---|---|
| DE | 19624079 C1 | 1/1998 |
| WO | WO 97/01184 | 12/1997 |

* cited by examiner

Primary Examiner—Harold I. Pitts
(74) Attorney, Agent, or Firm—Yen Tong Florczak

(57) ABSTRACT

(57) Abstract: A card reader (10, 20, 110. 120, 210) for receiving a smart card (12) having leading and trailing edges joined by sides and laterally and longitudinally spaced card contacts (14) on a contact surface is disclosed. The card reader (10, 20, 110,210, 310)includes a frame (30, 32. 130, 132, 230), a plurality of reader contacts (22), an insertion indicator switch (18, 118) and a spring element (48). The frame provides an insertion opening (50, 150, 151) having opposite sides for slidably receiving such a smart card (12). The plurality of reader contacts (22) are for engaging the card contact (14). The insertion indicator switch (18, 118) is positioned and configured on the reader (10, 20, 110, 120, 210) to establish when the card (12) is positioned such that the card contacts (14) and reader contacts (22) are engaged. The spring element (48) engages a side of such a card to urge the card against the opposite side of the opening (50, 150, 151).

24 Claims, 30 Drawing Sheets

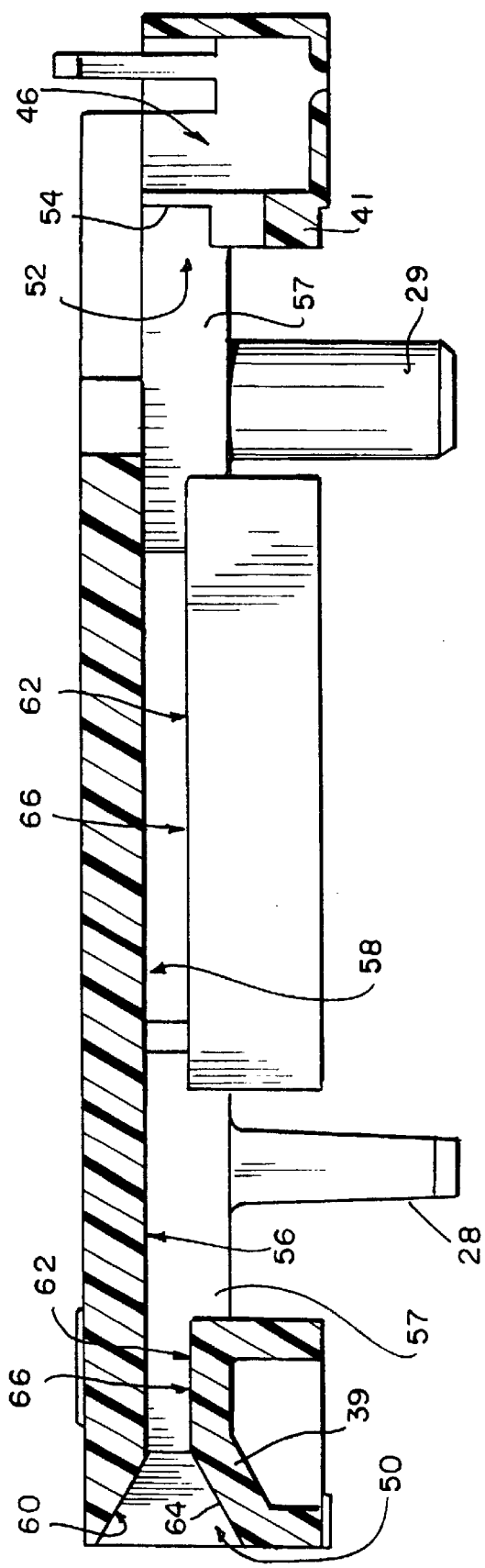

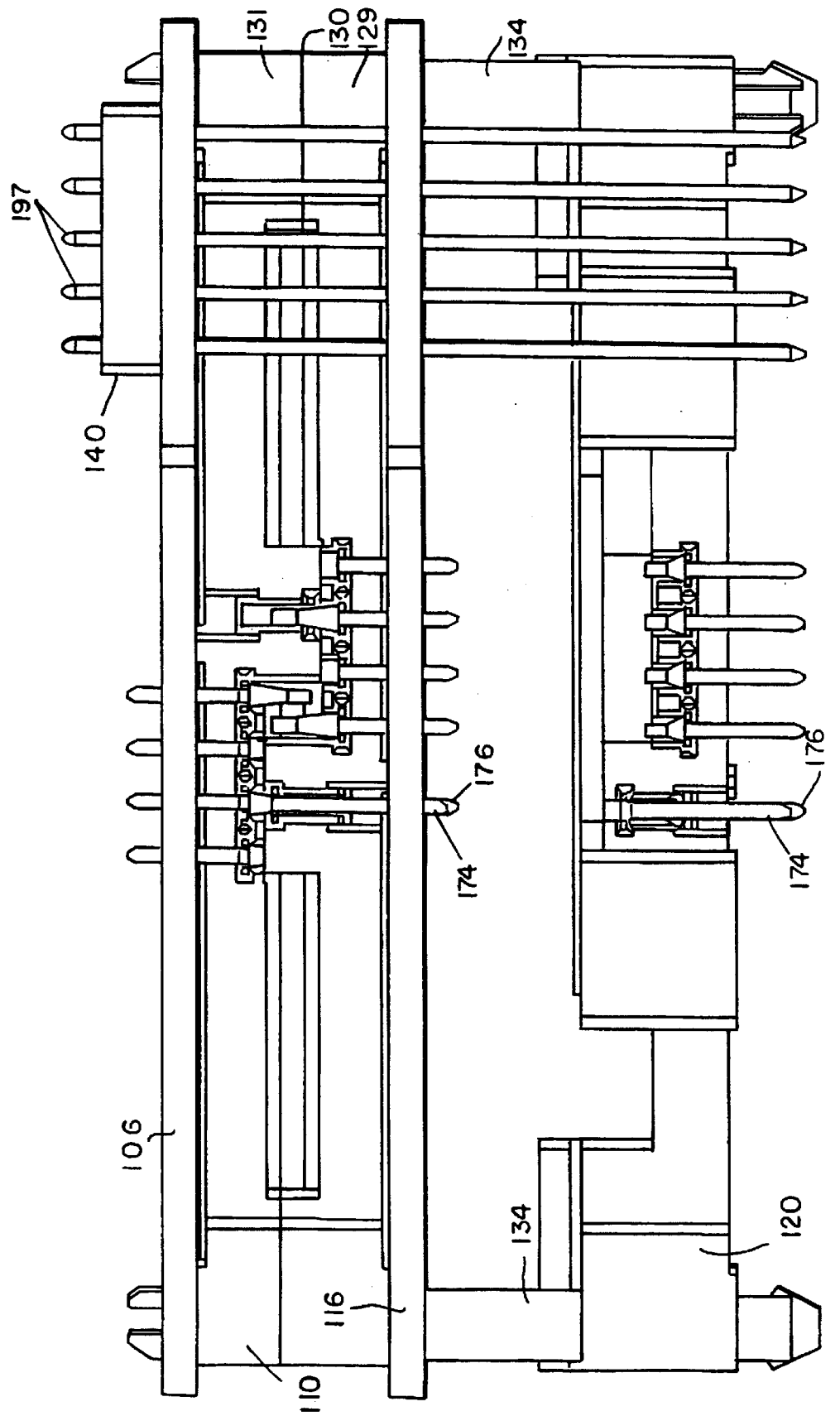

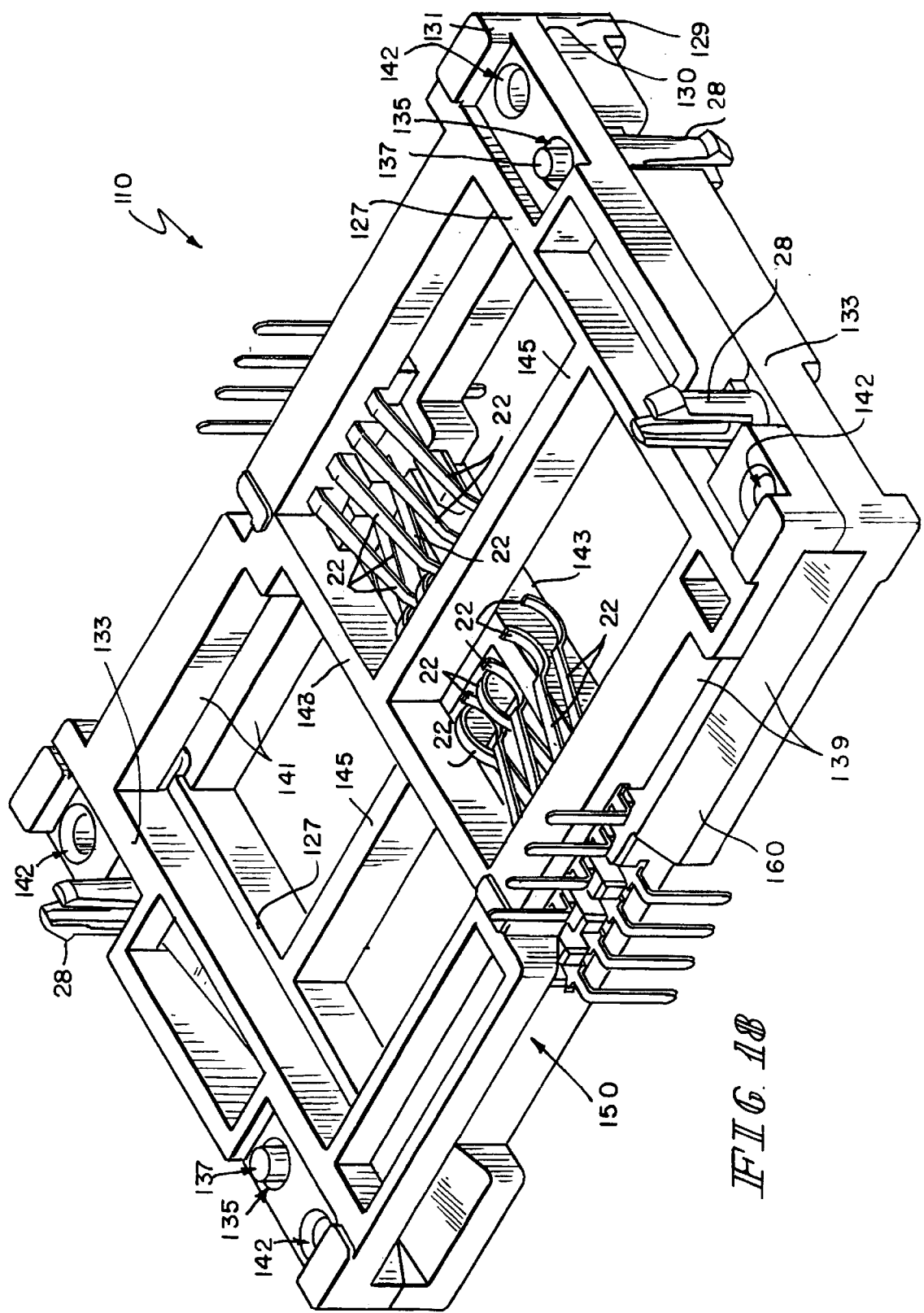

SMART CARD READER

This application claims the benefit of Provisional applications Nos. 60/142,261 filed Jul. 2, 1999, 60/159,027 filed Oct. 12, 1999 and 60/190,771 filed Mar. 20, 2000.

BACKGROUND AND SUMMARY OF THE INVENTION

This invention relates to electrical connectors in general The invention relates more specifically to electrical connectors known as smart card readers, in which a chip card, otherwise known as a smart card, can be inserted into a reading position where contact elements provided in the reader engage contact surfaces on the smart card.

Smart card readers are already known and attention is drawn to the following patents which are incorporated herein by reference: U.S. Pat. Nos. 4,976,630; 4,909,742; 5,225,653; 5,395,259; 4,752,234, 5,224,873; 5,252,815; 4,735,578; and 5,176,523.

In a conventional smart card reader, a stationary component, for example a frame, includes a moveable component, in the form of contact element support, that is reciprocally mounted between an initial and a reading position. The insertion of a smart card into such a reader causes the contact element support to move, from the initial position to the reading position, in such a manner that the contact elements therein supported engage the corresponding contacts on the card. The smart card is held in the reading position by an apparatus known as the smart card brake. Removal of the smart card from the reading position is accomplished by simply pulling the end of the card that projects from the reader, so that the card is released from the brake. During the removal process, the contact element support returns to the initial position by the action of a spring means on the contact support. A smart card reader of the type just described is said to operate according to the "push-pull principle".

It is also known to provide smart card readers that may be used in pairs, for example in a stacked configuration, in order to allow two readers to occupy roughly half of the amount of printed circuit board surface area, or so called real estate, that two non-stacked smart card readers would occupy if mounted side by side. In this conventional stacked configuration, one smart card reader is mounted directly above the other reader, and a printed circuit board is mounted between the two readers. The printed circuit board acts as an electrical connection point for the upper reader, and has a leader attached extending downwardly to the printed circuit board to which the lower reader is mounted.

There are four fairly common objectives of smart card readers. The first is to provide a reader that requires little space, particularly a small height. The second is to provide a reader that can be manufactured at a low cost, the components of which are amenable to both low cost fabrication and low cost assembly. The third is to provide a reader that does not have low mean time between failures in applications where smart cards are repeatedly inserted and removed. The fourth objective, which is common to smart card readers utilized in a stacked configuration, is to provide a pair of readers that consume as little printed circuit board real estate as possible.

In conventional smart card readers the moveable contact element support must be capable of vertical motion. Because of this, the height of the smart card reader must be increased. As smart card readers are used in smaller and smaller devices, for example palm computing devices, the height of the reader becomes a significant consideration. In many applications, the additional fraction of an inch (2.54 cm) in overall device height required by a conventional smart card reader may make the device unmarketable.

Conventional smart card readers that have moving parts, namely the contact element support and the spring means, are prone to eventual failure as the result of heavy usage. As cards are repeatedly inserted and removed from the readers, the guide elements of the contact support frame and the guide paths of the reader frame eventually wear out due to friction. When this happens, the reader will fail, for example the contact elements will no longer properly align with the smart card contacts.

Conventional smart card readers require a complex manufacturing process to produce the readers. This is because the frame and the contact element support must be manufactured separately, and then the two pieces must be assembled, together with a spring, to produce the finished reader.

Conventional stacked configuration smart card readers still consume a significant amount of real estate even though reduction of the use of printed circuit board real estate is an objective in their design. For example, a conventional smart card reader occupies more than two square inches (12.9 cm$^2$) of printed circuit board real estate, a significant amount by modem standards. In order to compensate for this usage of space, the printed circuit board to which the smart card reader is mounted is often enlarged.

Therefore, a card reader of the type for receiving a smart card having leading and trailing edges joined by sides and laterally and longitudinally spaced card contacts on a contact surface in accordance with the present invention includes a frame, a plurality of reader contacts, an insertion indicator switch and a spring element. The frame provides an insertion opening having opposite sides for slidably receiving such a smart card. The plurality of reader contacts are for engaging the card contact. The insertion indicator switch is positioned and configured on the reader to establish when the card is positioned such that the card contacts and reader contacts are engaged. The spring element engages a side of such a card to urge the card against the opposite side of the opening.

A card reader of the type for receiving a smart card having leading and trailing edges joined by sides and laterally and longitudinally spaced card contacts on a contact surface according to another aspect of the invention includes a frame and a plurality of reader contacts. The frame is a one-piece element providing an insertion opening defined by top sections and bottom sections having opposite sides for slidably receiving such a smart card. The plurality of reader contacts engaging the card contact.

A card reader of the type for receiving a smart card having leading and trailing edges joined by sides and laterally and longitudinally spaced card contacts on a contact surface according to yet another aspect of the invention includes a frame and a plurality of reader contacts. The frame provides an insertion opening having opposite sides for slidably receiving such a smart card. The plurality of reader contacts engage the card contacts and include an upper set of reader contacts and a lower set of reader contacts. The reader is configured to read a smart card with its card contacts facing upwardly or facing downwardly.

A card reader of the type for receiving a smart card having leading and trailing edges joined by sides and laterally and longitudinally spaced card contacts on a contact surface according to yet another aspect of the invention includes a frame and a plurality of reader contacts. The frame provides an insertion opening defined by a top and bottom sections having opposite sides for slidably receiving such a smart card. The insertion opening is configured to receive a double-thickness smart card. The plurality of reader contacts engage the card contacts. The reader contacts are provided on the bottom section and the upper section is provided with an element for urging the card against the reader contacts.

A card reader of the type for receiving a smart card having leading and trailing edges joined by sides and laterally and longitudinally spaced card contacts on a contact surface in accordance with the present invention includes a frame, a plurality of reader contacts, and an insertion indicator switch. The frame provides an insertion opening having opposite sides for slidably receiving such a smart card. The plurality of reader contacts are for engaging the card contact. The insertion indicator switch comprises a top switch contact and a bottom switch contact being relatively movable in the direction perpendicularly to the direction of card movement such that the leading edge of the card will move the switch contacts.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 9 is a sectional view along line 9—9 from FIG. 4 with the insertion indicator switch removed for clarity;

FIG. 17 is a back elevation view of the double stacked smart card reader of FIG. 14;

FIG. 18 is a top perspective view of the dual-sided top reader of the double stacked smart card reader of FIG. 14 with the upper and lower printed circuit boards removed for clarity;

FIG. 19 is a bottom perspective view of the dual-sided smart card reader of FIG. 18;

DETAILED DESCRIPTION OF THE DRAWINGS

Figure 1:
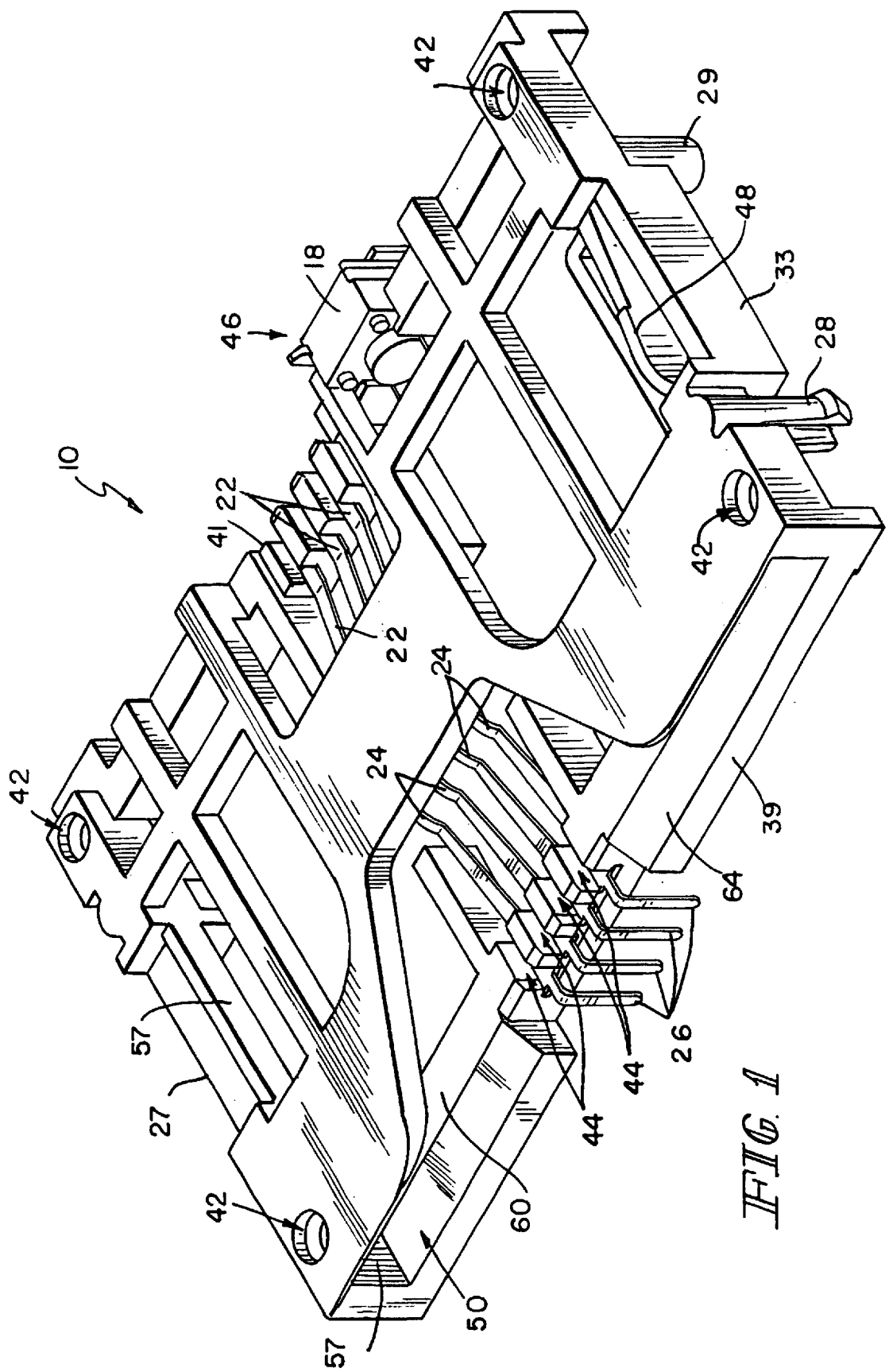
FIG. 1 is a top perspective view of a smart card reader that may be used in stand alone applications or as the top reader in a stacked configuration, the smart card reader has a frame defining an insertion opening and having mounting holes on the four corners, eight signal contacts mounted to the frame and extending inwardly from the front and rear of the frame, an insertion indicator switch mounted to the rear of the frame, and a card latch mounted to a side of the frame and extending into the insertion opening.

The smart card readers disclosed herein can be used in a stand alone configuration or as an upper or lower reader in a stacked configuration. FIGS. 1–4 illustrate an upper smart card reader 10 of the present invention, which is utilized as either the top smart card reader in a double (or stacked) configuration 8 (see FIGS. 10–13), or as the stand alone smart card reader in a single configuration. Reader 10 comprises frame 30, signal contacts 22, and an insertion indicator switch or sealed switch assembly 18. When a smart card 12 ( see FIGS. 29–31) is fully inserted into reader 10, card contacts 14 will be electrically connected with signal contacts 22 of reader 10, thereby providing an electrically conductive path from card contacts 14 through signal contacts 22 to the printed circuit board, such as PCB 16 (FIGS. 10–13) or a main printed circuit board (not shown), to which reader 10 is mounted. When the smart card 12 is fully inserted into reader 10, sealed switch assembly 18 is activated by the leading edge of card 12. The activation of switch 18 provides an indication to the equipment into which reader 10 is installed that smart card contacts 14 are electrically connected to signal contacts 22.

Frame 30 is a single piece of formed nonconductive material, such as Makrolon 9425, to which the other components are mounted. Frame 30 is formed with four mounting holes 42, two snap-mount legs 28, and two spacer posts 29. Mounting holes 42 provide a connection site for mounting pegs 36 of lower smart card reader 20 (see FIGS. 5–7) when upper reader 10 and lower reader 20 are utilized in a stacked configuration 8 (see FIGS. 10–13). Legs 28 provide for secure attachment of reader 10 to the printed circuit board to which reader 10 is mounted. Spacer posts 29 contact the PCB to which reader 10 is mounted to provide for stability. It is within the scope of the invention to provide three or four snap-mount legs 28 on frame 30 with each additional snap-mount leg 28 replacing a spacer post.

Signal contacts 22 are mounted into contact mounting notches 44 formed in the upper surface of lower front and rear rails 39, 41 of frame 30. Signal contacts 22 provide an electrical path between contacts 14 of card 12 and the printed circuit board to which reader 10 is mounted. Curved connection surfaces 24 of contacts 22 provide for a low coefficient of sliding friction with card 12 during insertion and removal, and also for reliable electrical coupling with card 12 during operation. Sealed switch assembly 18 is mounted in switch mounting section 46 formed in rear rail 41 of frame 30 in such a manner that switch 18 will be activated by smart card 12 when smart card 12 is fully inserted into reader 10.

Figure 5:
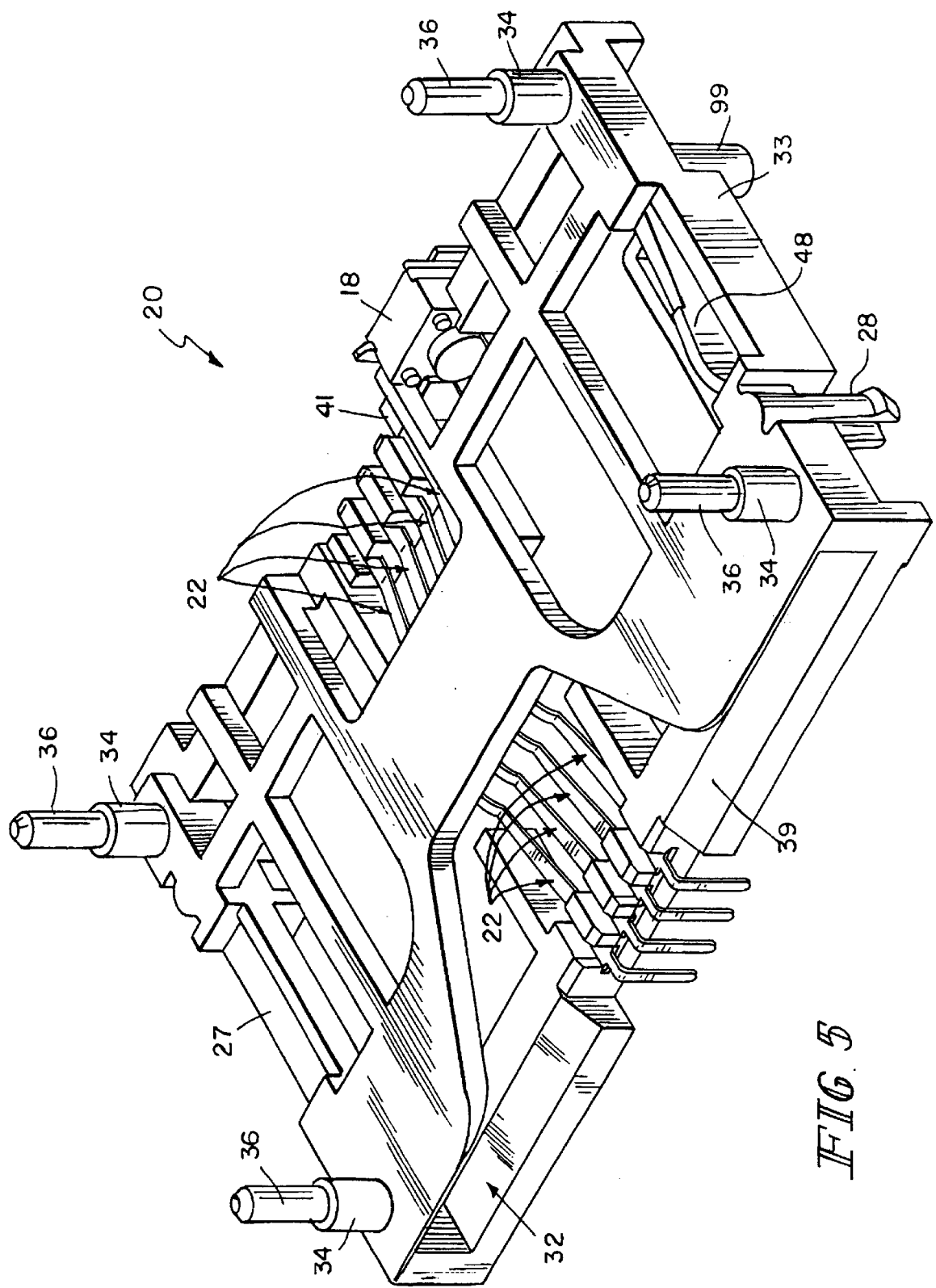
FIG. 5 is a top perspective view of a smart card reader for use as the top reader in a stacked configuration the smart card reader has a frame defining an insertion opening and having four mounting pegs and bases on the four corners, eight signal contacts mounted to the frame and extending inwardly from the front and rear of the frame, an insertion indicator switch mounted to the rear of the frame, and a card latch mounted to a side of the frame and extending into the insertion opening.
Figure 6:
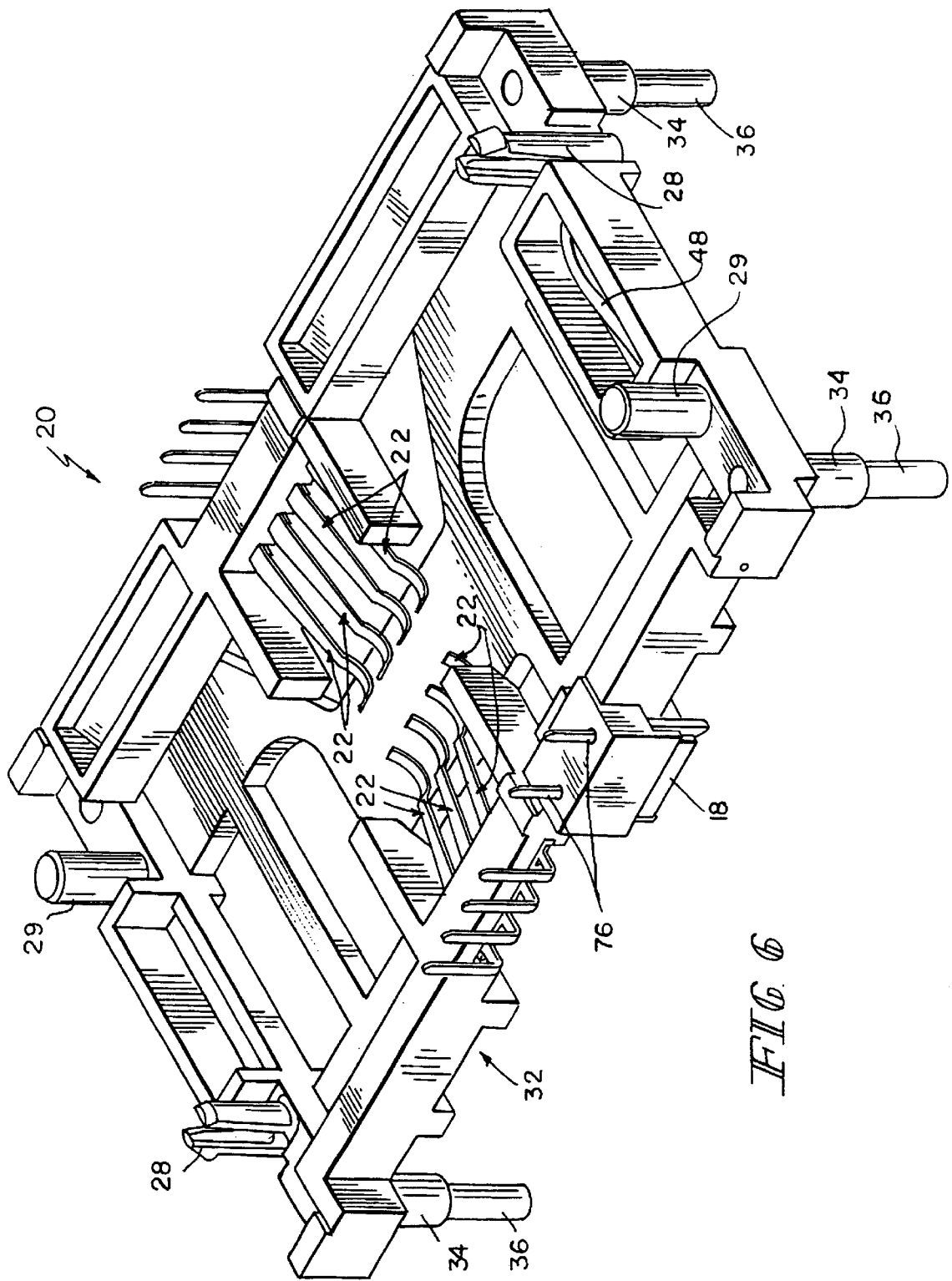
FIG. 6 is a bottom perspective view of the smart card reader of FIG. 5.
Figure 7:
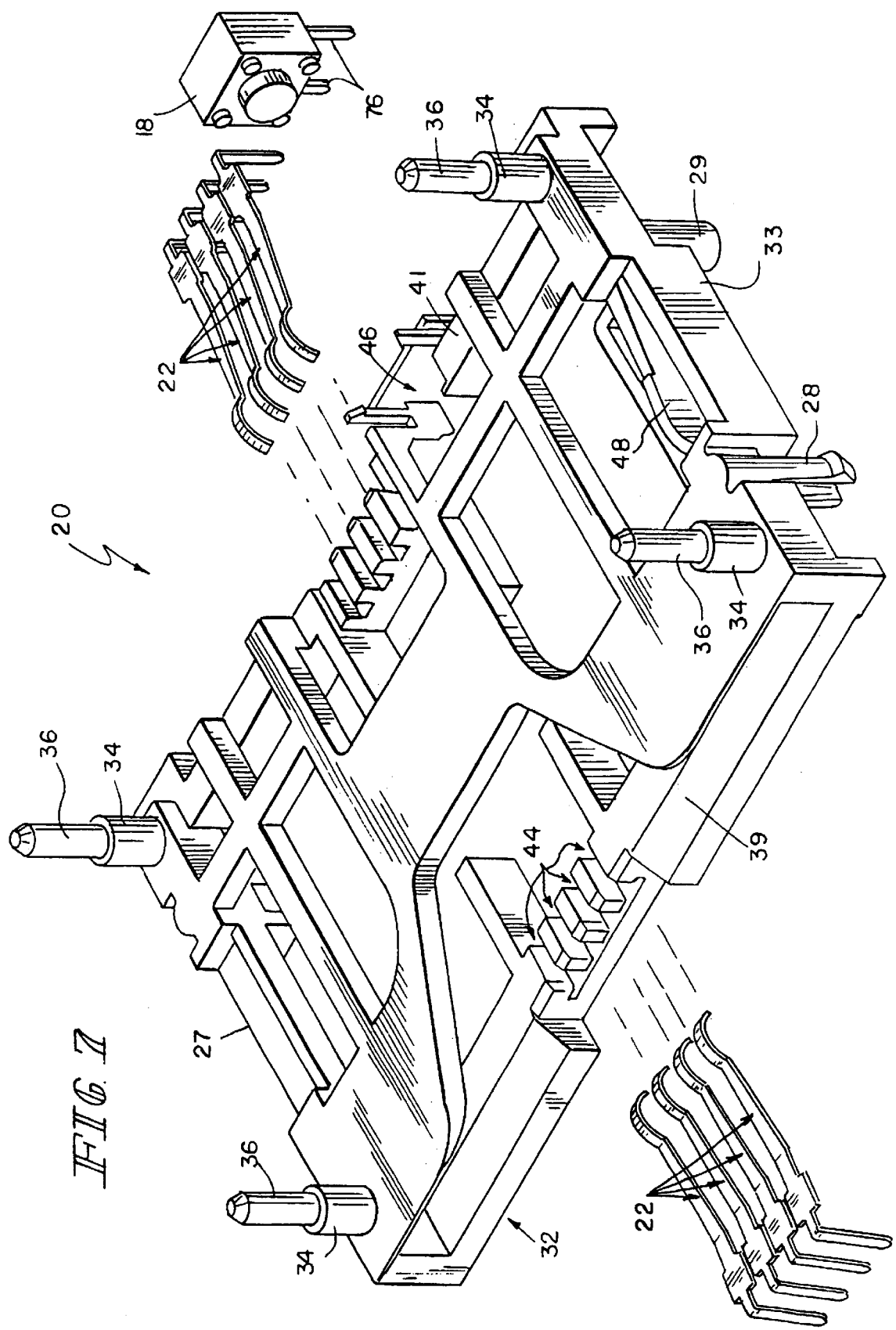
FIG. 7 is an exploded view of the smart card reader of FIG. 5.
Figure 8:
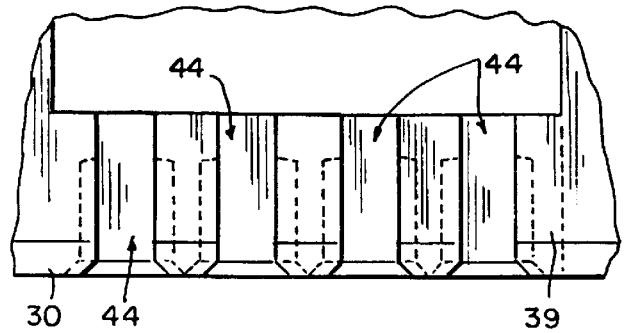
FIG. 8 is a magnified view of Area 8—8 from FIG. 4.

FIG. 5–7 illustrate a lower smart card reader 20 of the present invention, which is utilized as the bottom smart card reader in a double (or stacked) configuration. Reader 20 comprises frame 32, signal contacts 22, and sealed switch assembly 18. Frame 32 is a single piece of formed nonconductive material, such as Makrolon 9425, to which the other components are mounted. Frame 32 is formed with four mounting peg bases 34, four mounting pegs 36, two snap-mount legs 28, and two spacer posts 29. Peg bases 34 provide for support of printed circuit board 16 to which upper smart card reader 10 is mounted when upper reader 10 and lower reader 20 are used in a stacked configuration 8. (Refer to FIGS. 10–13.) Pegs 36 provide support and retention of upper reader 10 when upper reader 10 and lower reader 20 are used in a stacked configuration 8. Legs 28 provide for secure attachment of reader 20 to the printed circuit board (not shown) to which reader 20 and frame 32 are mounted.

Signal contacts 22 are mounted into contact mounting notches 44 formed in the upper surface of lower front and rear rails 39, 41 of frame 32. Signal contacts 22 provide an electrical path between contacts 14 of card 12 and the printed circuit board to which reader 20 is mounted. Curved connection surfaces 24 of contacts 22 provide for a low coefficient of sliding friction with card 12 during insertion and removal, and also for reliable electrical coupling with card 12 during operation. Switch assembly 18 is mounted in switch mounting section 46 formed in rear rail 41 of frame 32 in such a manner that switch 18 will be activated by smart card 12 when smart card 12 is fully inserted into reader 10.

Note that frame 30 of upper smart card reader 10 and frame 32 of lower smart card reader 20 are identical with the exception that frame 30 is formed with mounting holes 42, while frame 32 is formed with mounting peg bases 34 and mounting pegs 36. Therefore, only upper reader 10 and frame 30 will be discussed in detail below, it being understood that lower reader 20 and frame 32 are similarly configured.

As shown, for example, in FIGS. 1–4 and 8, contact mounting notches 44 are formed in front and rear rails 39, 41 of frame 30 to provide a mounting location for signal contacts 22. After frame 30 has been formed, retention tab sections 84 of signal contacts 22 are mounted to frame 30 at the location of mounting notches 44.

Switch tails or terminals 76 are mounted to the circuit board to which the reader 10, 20 is mounted, and provide an electrical connection between the circuit board and the switch 18. Switch 18 is either a normally-open or a normally-closed, single-pole, single-throw momentary switch, which provides an indication to the device in which the card reader 10 or 20 is installed that a smart card 12 is fully inserted in the reading position. As previously stated, switch mounting section 46 is formed in rear rail 41 of frame 30 to provide a mounting location for switch assembly 18, as shown, for example, in FIG. 4.

Card latch or spring member 48 is formed in aperture of side rail 33 of frame 30 and provides a coefficient of friction that is sufficient to prevent card 12 from being removed unintentionally from reader 10. Spring 48 provides this coefficient of friction by exerting force on card 12 tangentially to the direction of movement of card 12 in card slot 50. This force creates friction between card 12 and spring 48, and also between card 12 and the vertical interior surface 57 of side rail 27 of card slot 50 that is opposite spring 48.

Figure 2:
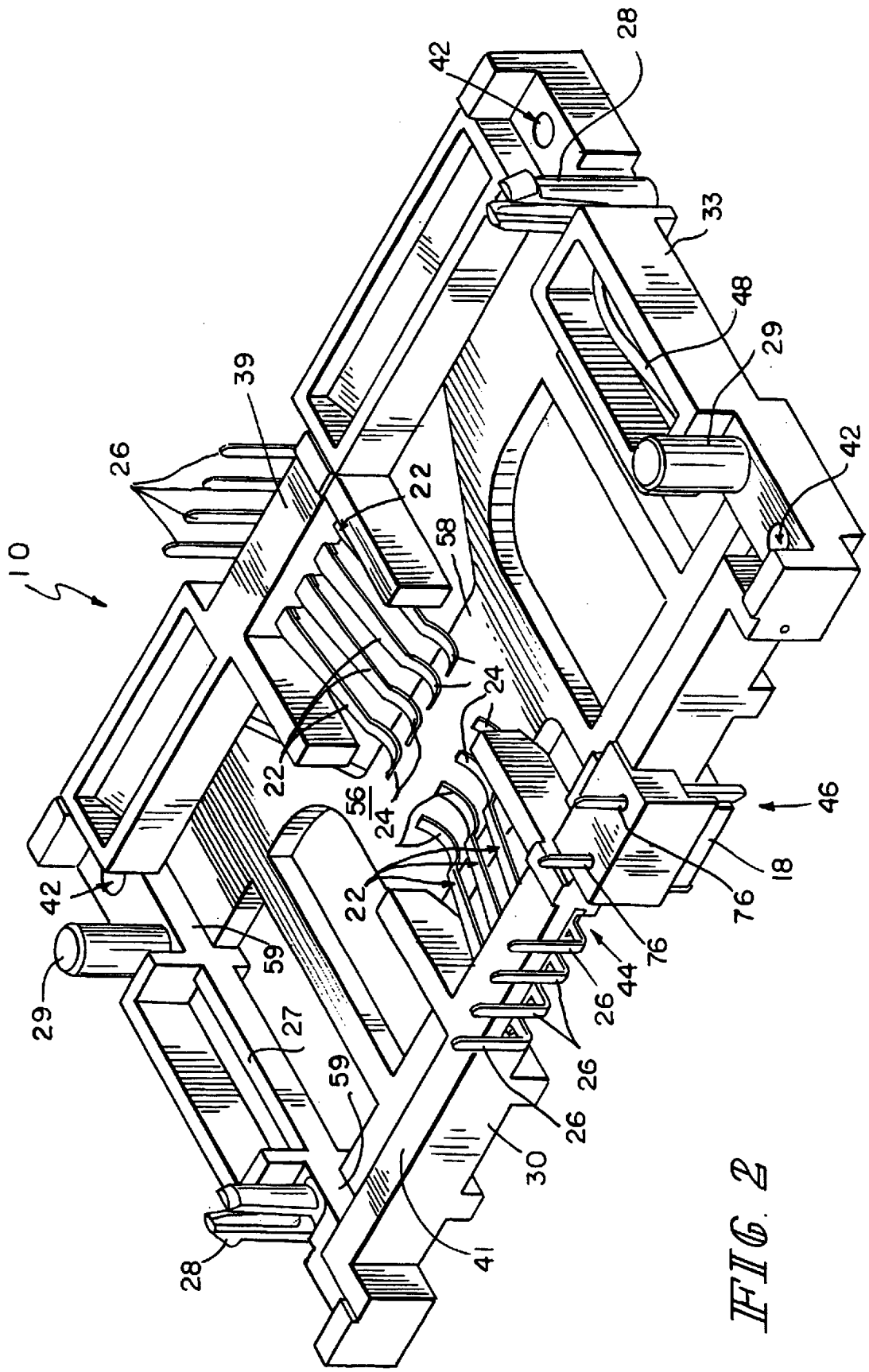
FIG. 2 is a bottom perspective view of the smart card reader of FIG. 1.
Figure 3:
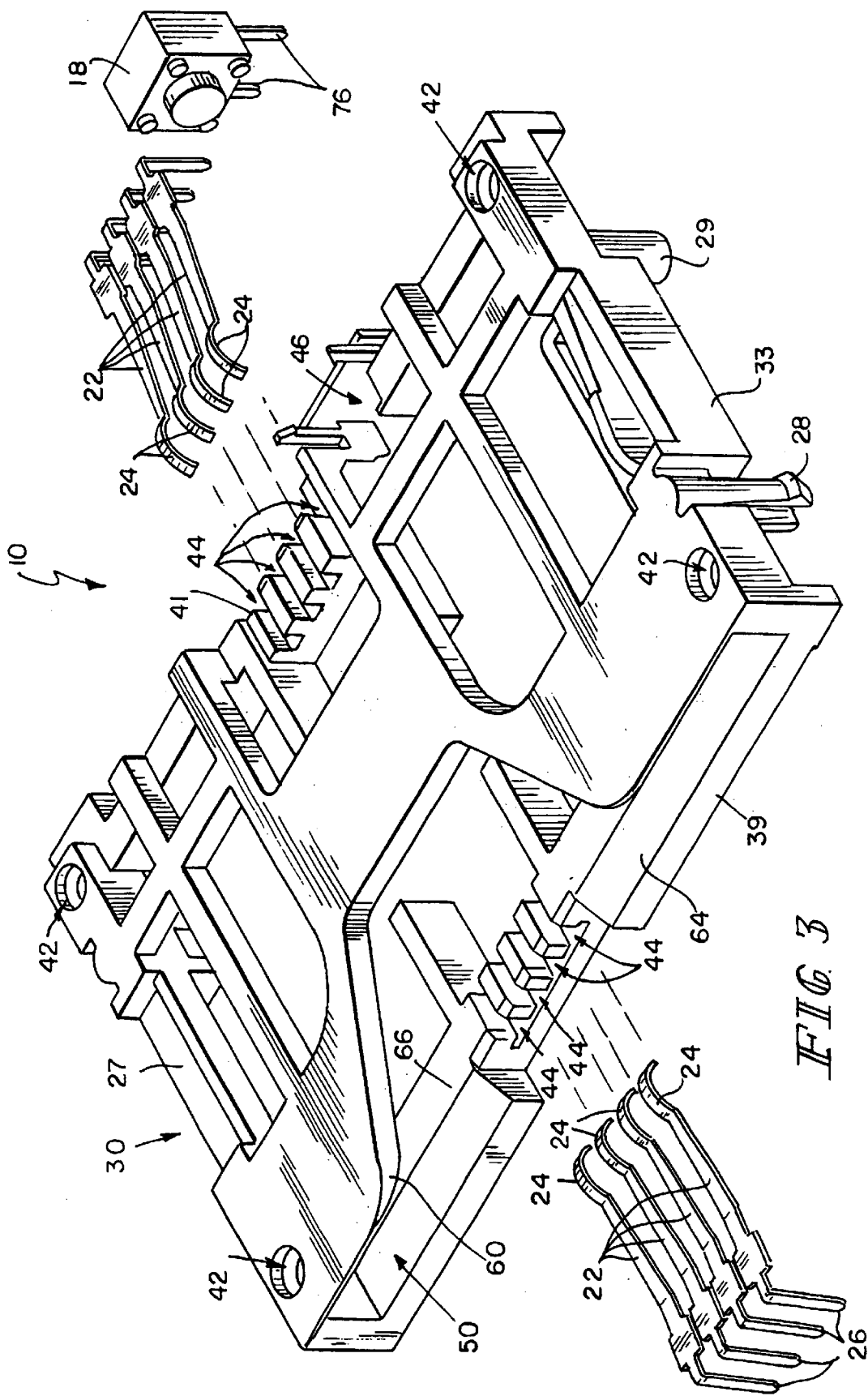
FIG. 3 is an exploded view of the smart card reader of FIG. 1.
Figure 4:
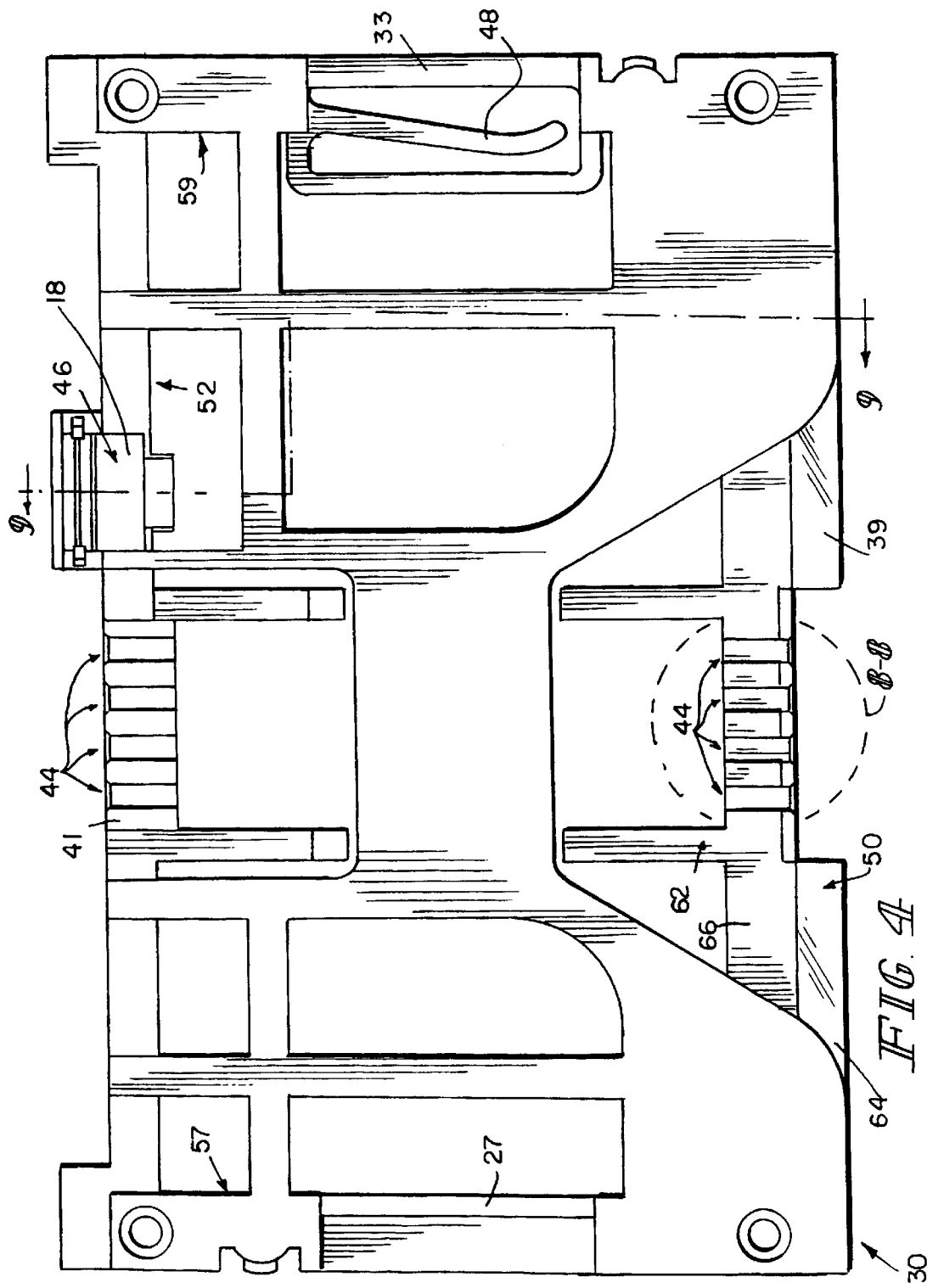
FIG. 4 is a plan view of the reader of FIG. 1 with the contacts removed for clarity.

FIG. 9 illustrates primarily the location of the card slot 50 in relation to the upper and lower surfaces of frame 30. FIG. 9 also illustrates the location of snap-mount legs 28 and spacer post 29 beneath frame 30, and the location of switch mounting section 46 on frame 30. Card slot 50 is a space provided for smart card 12, which is defined by several surfaces, four of which are visible in FIG. 9. The visible portions of frame 30 in FIG. 9 that define card slot 50 are slot top section 58, slot bottom section 62, left vertical side wall 57 of side rail 27, and slot rear section 52. The fifth section of card slot 50, right vertical wall 59 of side rail 33, is shown in FIGS. 2 and 4 and is similar to left vertical side wall 57. Top section 58 comprises contact face 56 and guide ramp face 60. Guide ramp face 60 provides for guidance of card 12 into slot 50 during initial insertion of card 12. Contact face 56 provides limitation against movement in the upward direction of card 12 and exerts a force normal to the top surface of card 12 opposite the force exerted by spring loaded signal contacts 22 on the bottom surface of card 12, thereby retaining card contacts 14 in engagement with signal contacts 22 of reader 10.

Bottom section 62 of card slot 50 comprises contact face 66 and guide ramp face 64. Guide ramp face 64 provides for guidance of card 12 into slot 50 during initial insertion of card 12. Contact face 66 provides limitation against movement in the downward direction of card 12. Slot rear section 52 comprises contact face 54, which limits movement of card 12 in the direction of insertion.

FIGS. 10–13 illustrate an embodiment of the present invention utilizing two smart card readers, upper smart card reader 10 and lower smart card reader 20, in a stacked configuration 8, to provide for the utilization of two smart cards 12. PCB 16 is mounted to upper reader 10, and lower reader 20 is mounted to PCB 16 and upper reader 10. Downward retaining force is exerted on reader upper 10 by mounting pegs 36, as the tops of pegs 36 are deformed during the assembly process so that the tops of pegs 36 are larger than the diameter of mounting holes 42. This deformation of pegs 36 causes pegs 36 to act as rivets, and to therefore perform a retaining function. Upper reader 10 is electrically connected to the circuit board to which lower reader 20 is mounted via PCB 16 and header assembly 40.

As shown, for example, in FIGS. 10–13, PCB 16 is sandwiched between upper and lower readers 10 and 20. Mounting pegs 36 extend upwardly from mounting peg bases 34 of lower reader 20, and extend through peg mounting holes 80 of PCB 16 and mounting holes 42 of upper reader 10. Peg bases 34 provide for proper clearance between PCB 16 and lower reader 20, so that electrical components 82 may be mounted to the bottom surface of PCB 16. Upper reader 10 attaches to circuit board 16 via tails 26 of signal contacts 22. Traces (not shown) on PCB 16 couple tails 26 and switch tails 76 to header assembly 40. PCB 16 connects electrically to the circuit board (not shown) to which lower card reader 20 is affixed via header assembly 40. Legs 28 of upper reader 10 attach to PCB 16 at the location of holes 81 in PCB 16. Legs 28 of lower reader 20 similarly attach to the circuit board (not shown) in the device in which card readers 10 and 20 are utilized.

Figure 12:
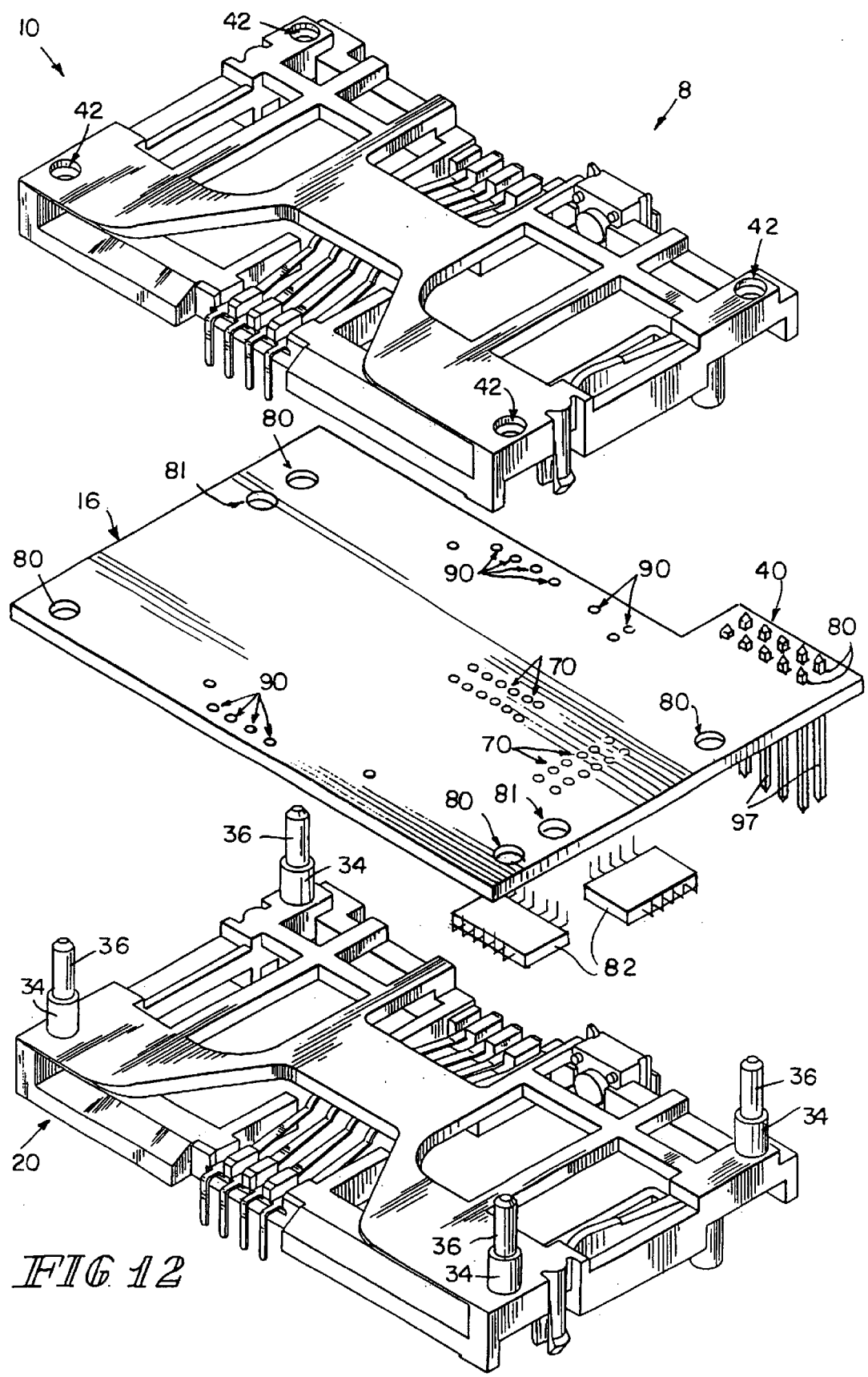
FIG. 12 is an exploded view of the stacked smart card readers of FIG. 10.
Figure 13:
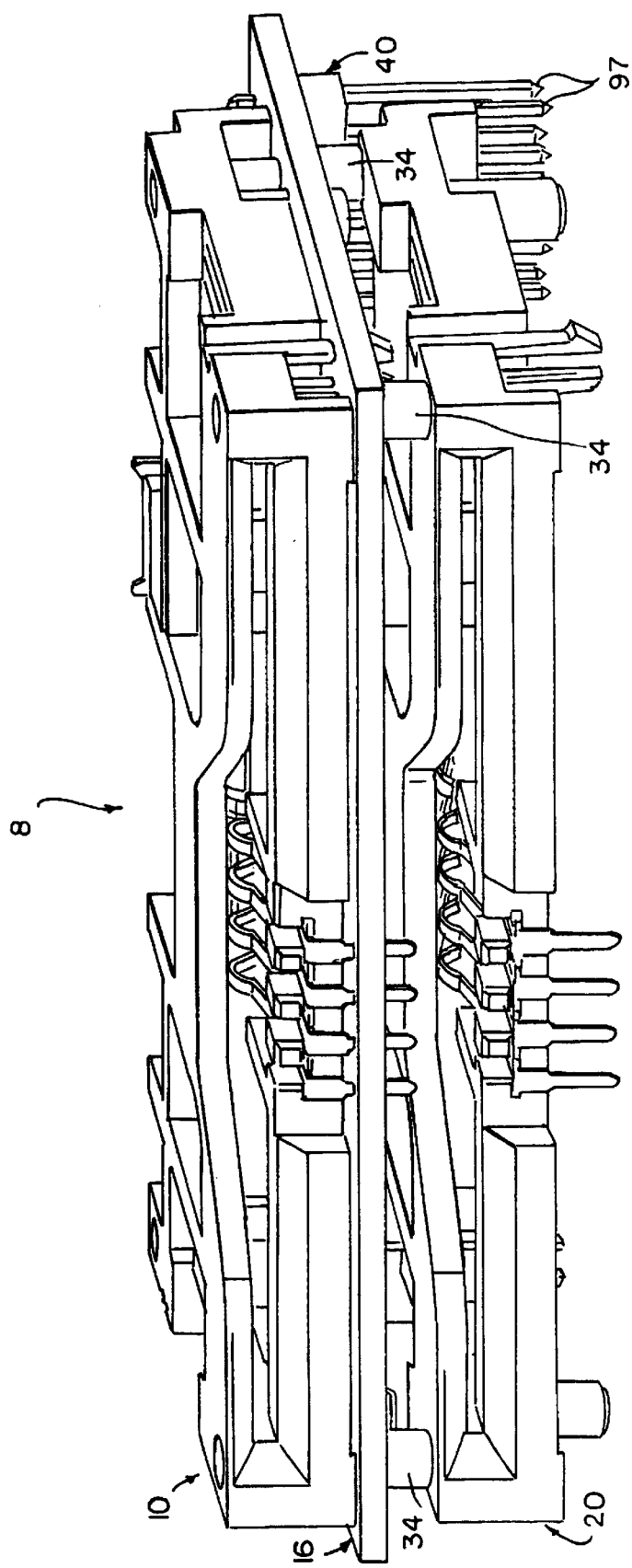
FIG. 13 is a front perspective view of the stacked smart card readers of FIG. 10.
Figure 14:
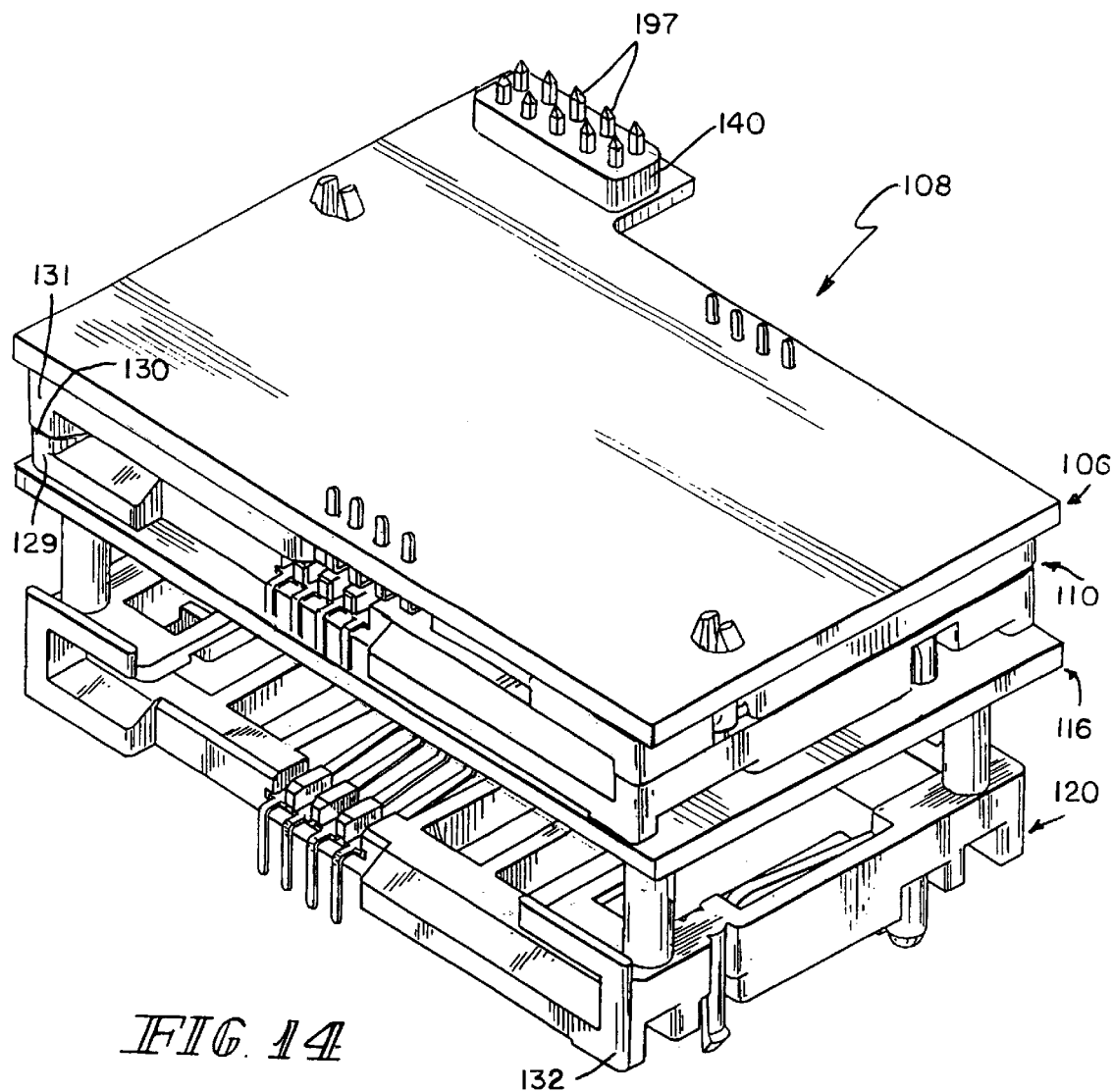
FIG. 14 is a top perspective view of a double stacked smart card connector including a dual-sided top reader and a double-thickness bottom reader with a printed circuit board sandwiched between the top and bottom reader and a top printed circuit board coupled to the top reader.
Figure 15:
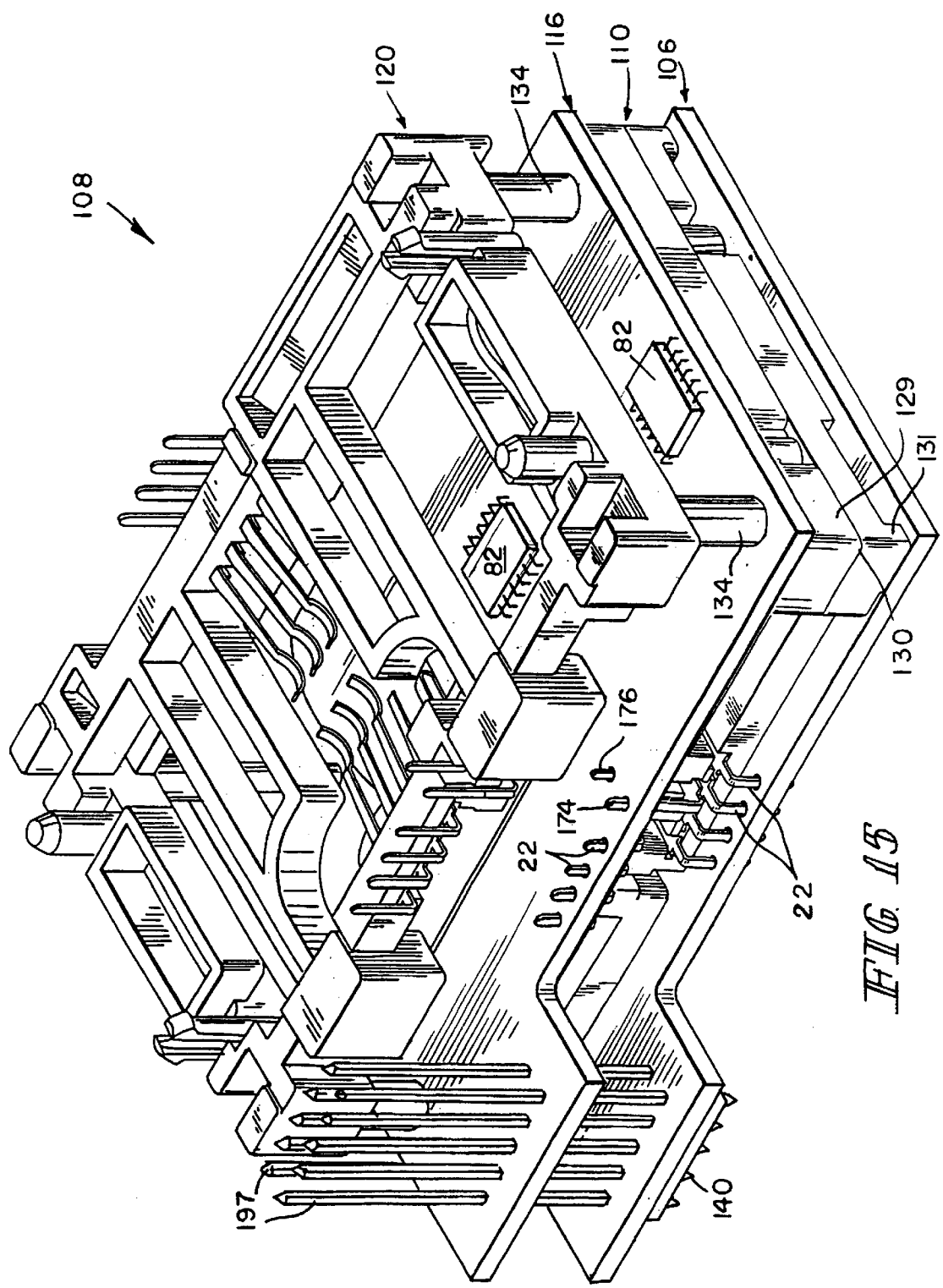
FIG. 15 is a bottom perspective view of the double stacked smart card connector of FIG. 14.
Figure 16:
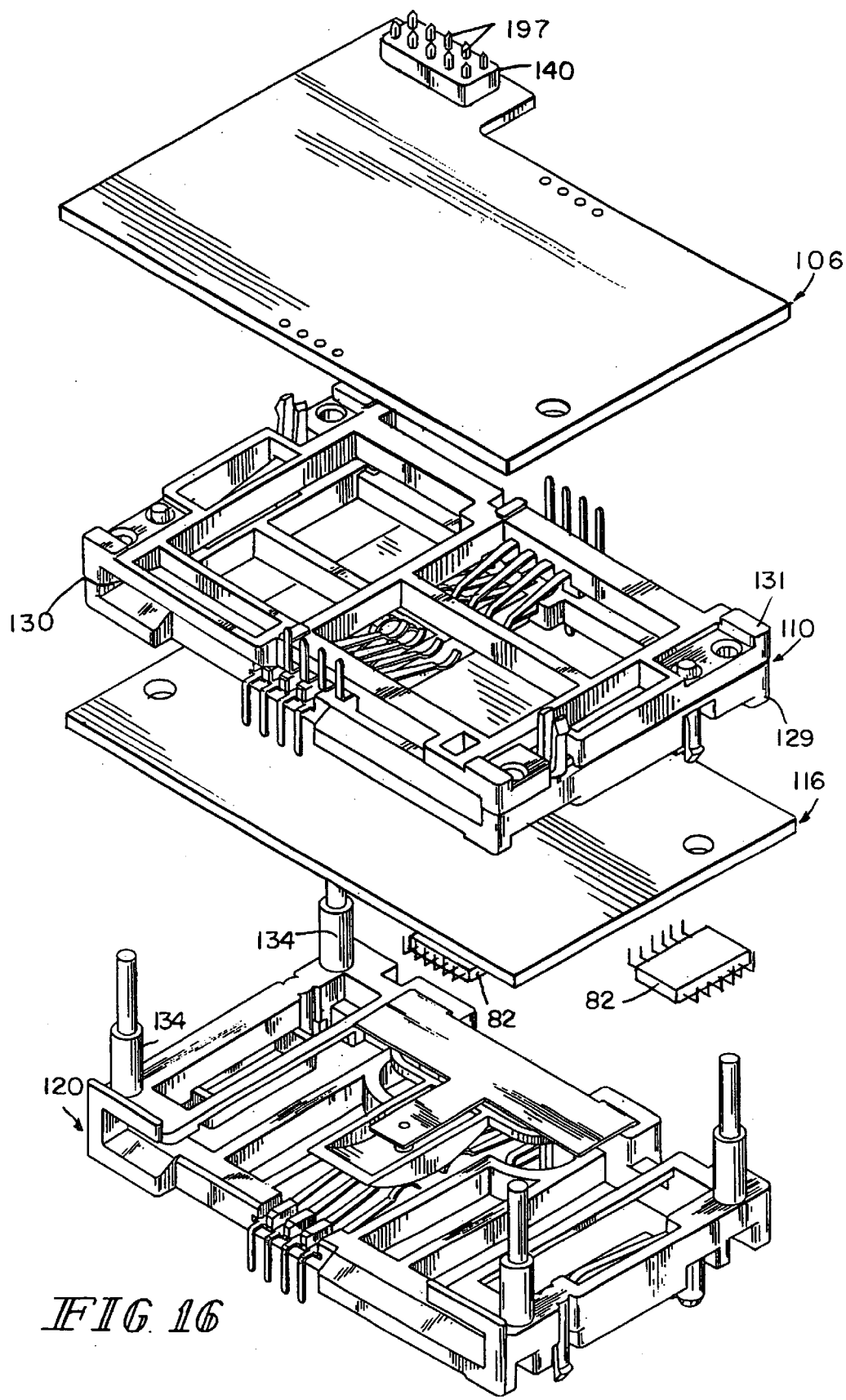
FIG. 16 is an exploded view of the double stacked smart card connector of FIG. 14.
Figure 49:
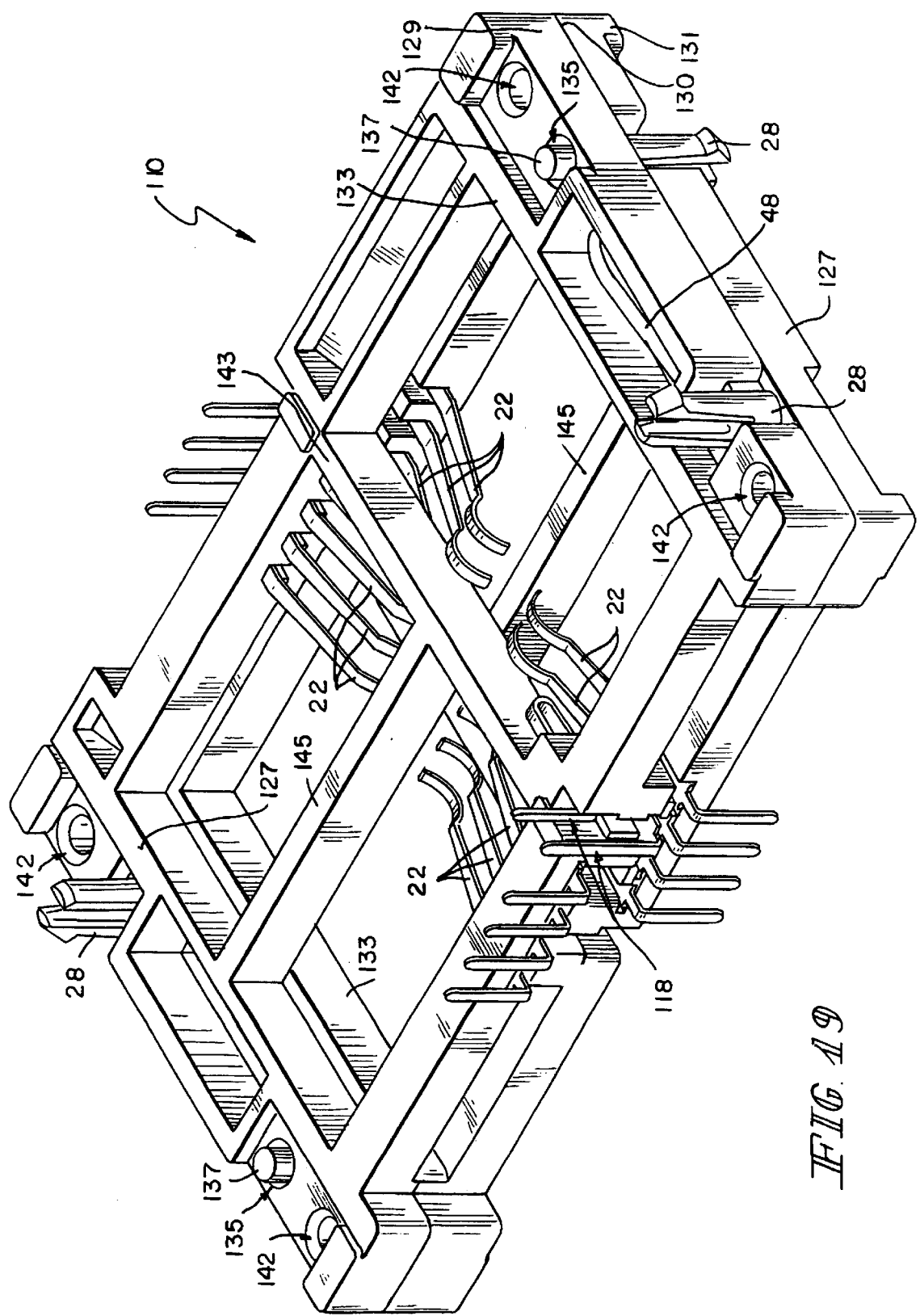

As shown, for example, in FIG. 12, PCB 16 of double smart card reader 8 includes mounting peg holes 80, leg mounting holes 81, header coupling holes 88, contact tail holes 90, and detection switch tail holes 92. Contact tails 26 of contacts 22 extend through contact tail holes 90 and are soldered to PCB 16. Similarly, leaders of header 40 extend through header coupling holes 88 and are soldered to PCB 16. Insertion indicator switch tails 76 extend through detection switch tail holes 92 and are soldered to printed circuit board 16. Soldering of the various leaders facilitates coupling of the header 40, contacts 22, and switch 18 to circuitry (not shown) on the printed circuit board 16.

PCB 16 includes top and bottom surface conductive layers for inclusion of active components 82 on PCB 16 in accordance with the present invention. While illustrated as two DIP chips, active components 82 may include such items as capacitors, diodes, and integrated circuits such as a Multiprotocol IC Card Coupler TDA8006, resistors, inductors, and the like.

To facilitate proper connection of various components to PCB 16, certain holes in PCB are plated and others are not. For example, peg mounting holes 80 are not plated as no electrical coupling is accomplished. Holes 81 are likewise not plated. Contact tail holes 90 are plated to facilitate coupling contact tails 26 to PCB 16. Similarly, leaders 97 of header 40 extend through plated header coupling holes 88. Switch leaders 76 also extend through plated switch tail holes 92 and are soldered to printed circuit board 16. PCB 16 may also include other plated coupling holes (not shown) for coupling active components to PCB 16.

FIGS. 14–17 illustrate the double stacked smart card reader 108 utilizing dual-sided smart card reader 110 and double-thickness smart card reader 120 to provide for the utilization of two smart cards 12. This embodiment of the present invention addresses the consumption of printed circuit board real estate by stacking a dual-sided smart card reader, i.e., a smart card reader that can read the smart card independent of the orientation of the smart card, with a double-thickness smart card reader, i.e., a smart card reader capable of reading standard thickness and doublethickness smart cards. In this stacked configuration 108, printed circuit board 116 is mounted to dual-sided reader 110, and double-thickness reader 120 is mounted to card 116 and upper reader 110. Contacts 22 of upper frame component 131 of dual-sided reader 110 are electrically coupled to upper printed circuit board 106 which is electrically connected to printed circuit board 116 by header 140. Contacts 22 of lower frame component 129 of dual-sided reader 110 are electrically coupled to printed circuit board 116 which is coupled to the circuit board (not shown) to which double-thickness reader 120 is mounted via header assembly 140.

Referring to FIGS. 14–17, there is shown a double stacked smart card reader 108 including a double-thickness smart card reader 120, a dual-sided smart card reader 110, a PCB 116, and a second PCB 106. PCB 116 is sandwiched between double-thickness smart card reader 120, shown as lower card reader, and dual-sided smart card reader 110, shown as the upper smart card reader. Both PCBs 116 and 106 may have electronic components 82 (shown only on PCB 116) and printed circuitry thereon, similar to PCB 16 described above, to facilitate size reduction of the circuit board (not shown) to which the double stacked smart card reader 108 is mounted. As used in this application, the term dual-sided smart card reader 110 indicates that the smart card reader is able to read information contained on a smart card 12 independently of the position of the smart card 12 in the reader 110. Also, the term double-thickness smart card reader 120 indicates that the smart card reader is able to read information contained on both a standard thickness and a double-thickness smart cards.

Dual-sided smart card reader 110 is designed for a standard (0.8 mm) card 12 and thus includes a single thickness opening 150. The connection of the electrical contacts 22 situated on the upper and lower frame members 131, 129 of the dual-sided reader 110 must also be transferred to the mainboard (not shown). This connection is made with printed circuit board 116, printed circuit board 106 and standard NHE connector or header 140 as shown, for example, in FIGS. 14–17 and as described above. This solution makes it possible to upgrade existing smart card readers (single reading) to a dual-sided version 110. The mainboard of the customer remains the same.

A double stacked smart card connector 108 including a dual-sided top reader 110 and a double-thickness bottom reader 120 with a printed circuit board 116 sandwiched between the top reader 110 and bottom reader 120 and a top printed circuit board 106 coupled to top reader 110 is shown in FIGS. 14–17. It should be understood, however, that it is within the teachings of this disclosure to stack any combination of standard thickness smart card readers 10, 210 in combination with double-thickness smart card readers 120 and dual-sided smart card readers 110.

Figure 20:
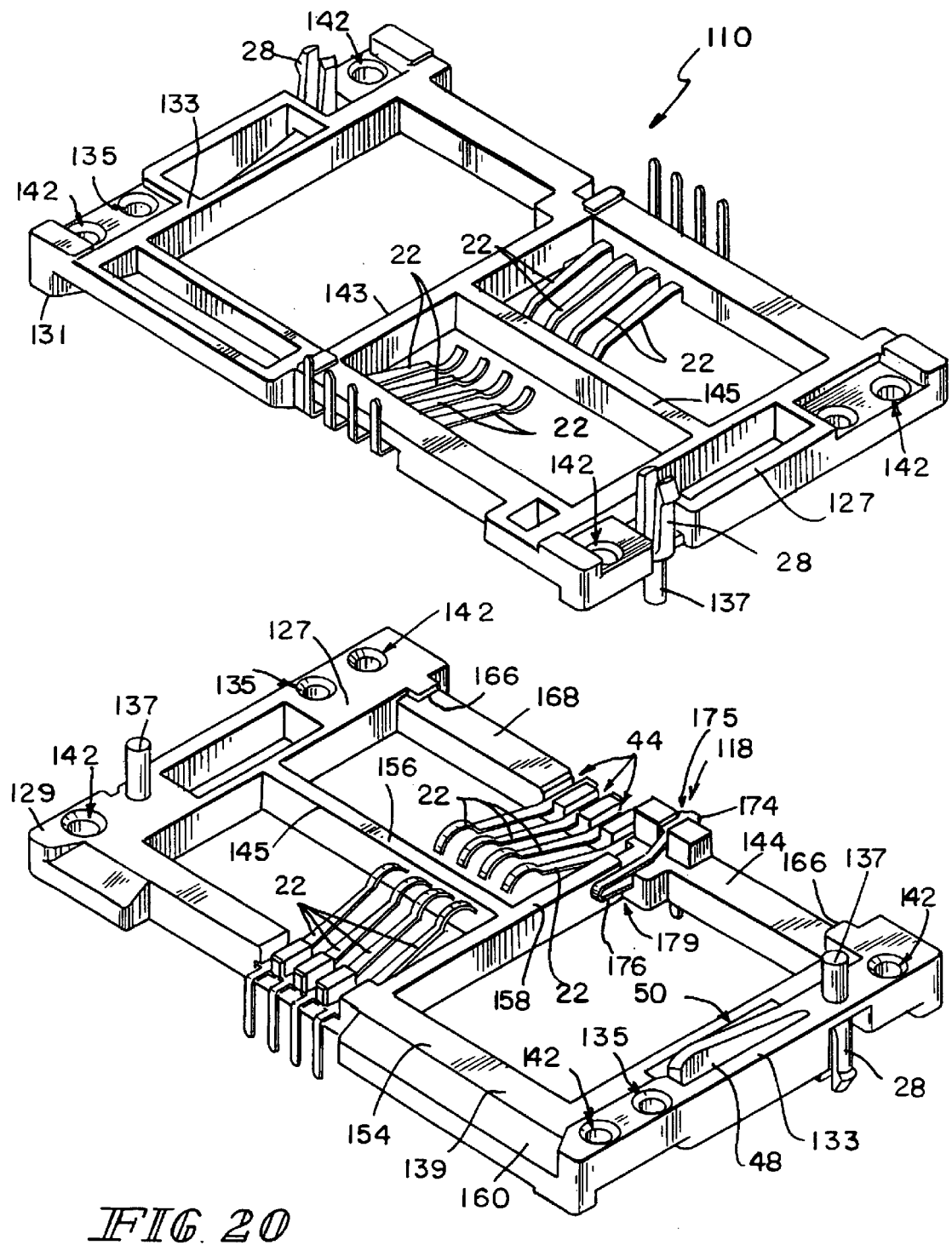
FIG. 20 is an exploded view of the dual-sided smart card reader of FIG. 18.
Figure 21:
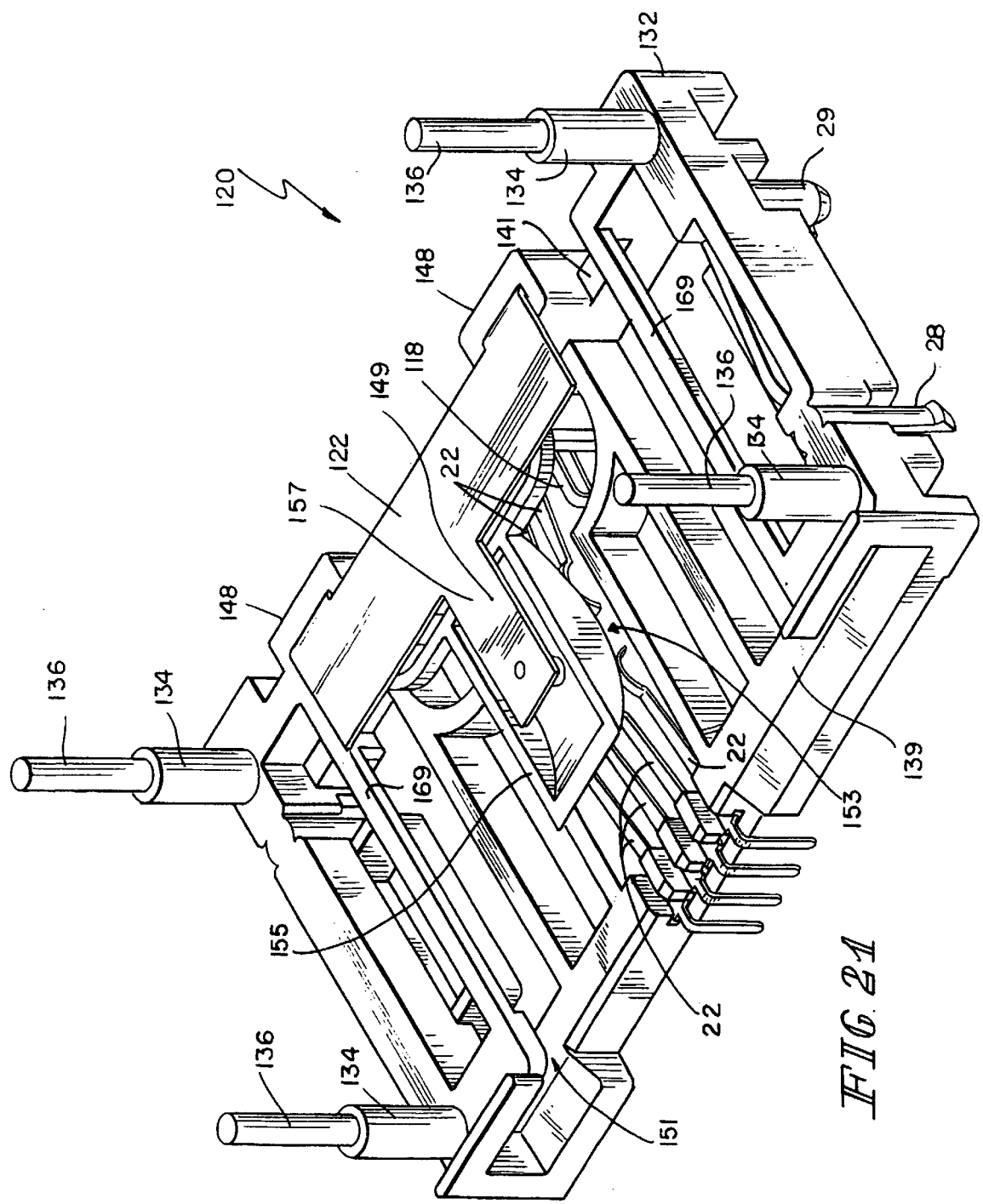
FIG. 21 is a top perspective view of the bottom double-thickness reader of the double stacked smart card connector of FIG. 14
Figure 22:
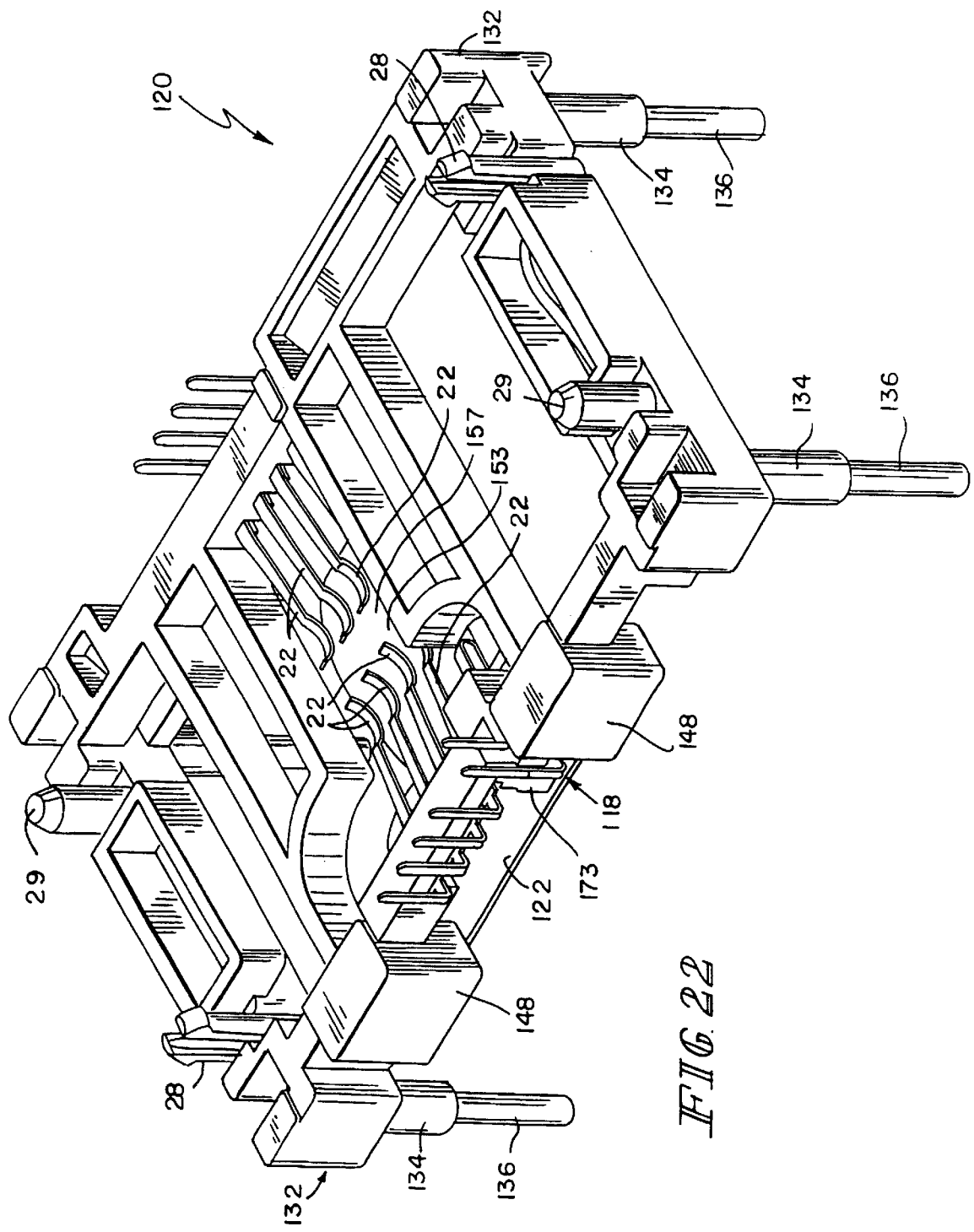
FIG. 22 is a bottom perspective view of the double-thickness smart card reader of FIG. 21.
Figure 23:
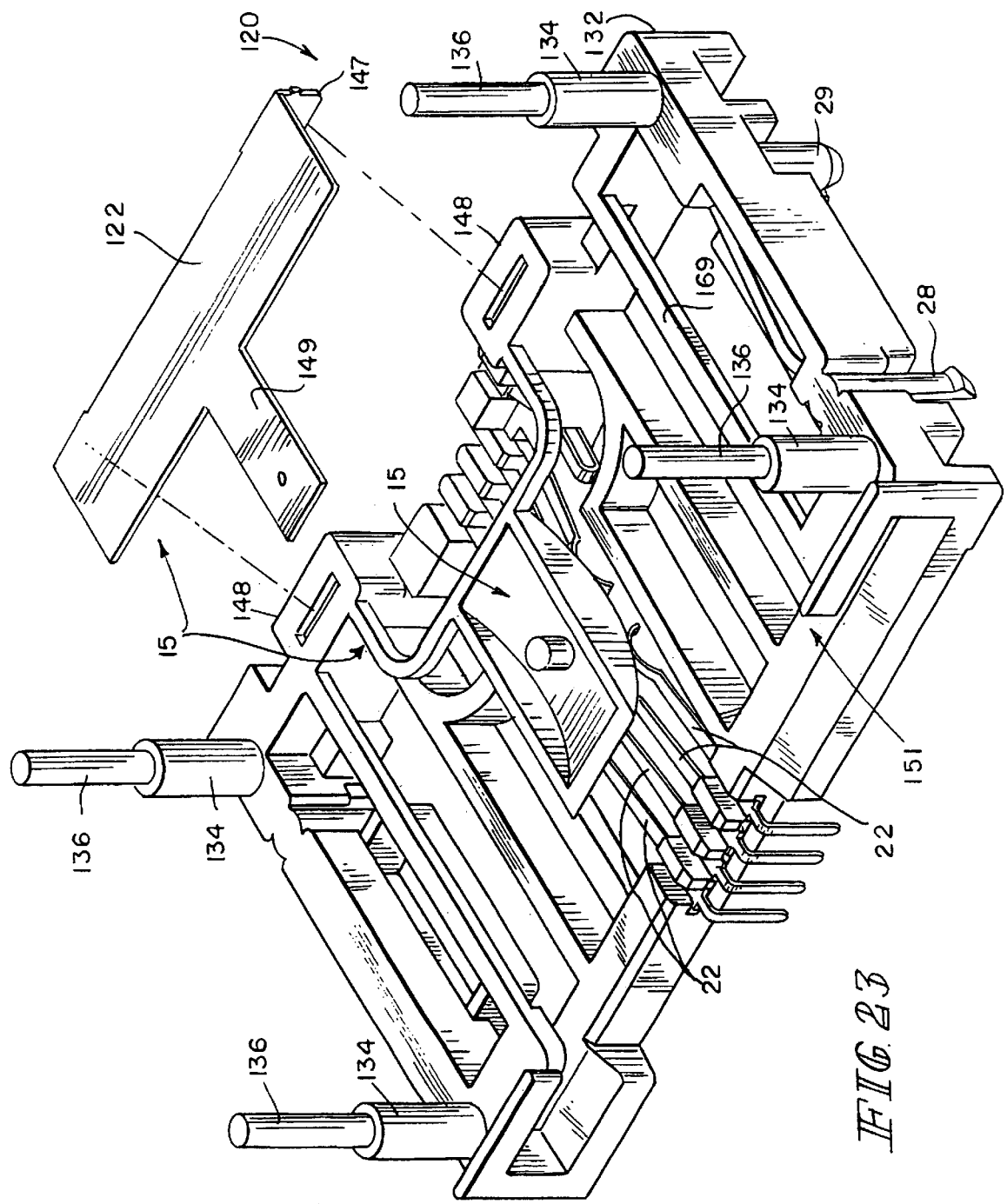
FIG. 23 is a partially exploded view of the double-thickness smart card reader of FIG. 21.

Dual-sided smart card reader 110 is illustrated standing alone in FIGS. 18–20. As previously stated top reader 110 is dual-sided meaning that reader 110 is capable of reading the information of the smart card 12 independently of the position of the card 12 in reader 110. To facilitate reading of a smart card 12 independent of its orientation, i.e., upside-up or upside-down, electrical contacts 22 are present both on the lower part 129 of frame 130 of reader 110 and on upper part 131 frame 130 of reader 110 as shown in FIGS. 18–20. Dual-sided smart card reader 110 is designed for a standard (0.8 mm) card 12 and thus includes a single thickness opening 150. The connection of the electrical contacts 22 situated on the upper and lower components 131, 129 of frame 130 of the dual-sided reader 110 must also be transferred to the mainboard (not shown). This connection is made with printed circuit board 116, printed circuit board 106 and standard NHE connector or header 140 as described above. Only a single NHE header 140 is used to connect printed circuit board 116 and top printed circuit board 106. This solution makes it possible to upgrade existing smart card readers (single reading) to a dual-sided version 110. The mainboard of the customer remains the same.

Referring to FIGS. 18–20, the construction of the dual-sided smart card reader 110 is illustrated. Dual-sided card reader 110 includes a frame 130 having an upper frame member 131 and a lower frame member 129, a plurality of signal contacts 22, and an unsealed insertion indicator switch 118. Lower frame member 129 and upper frame member 131 each are formed nonconductive material such as Makrolon 9425. Advantageously, upper frame member 131 and lower frame member 129 are symmetrical allowing them to be made from a single mold thereby reducing the cost of manufacture of dual-sided smart card reader 110. Therefore, in describing both upper frame member 131 and lower frame member 129, reference will be made to lower frame member 129, it being understood that upper frame member is virtually identical. The only differences between upper frame member 131 and lower frame member 129 are that insertion indicator switch 118 is not mounted to upper frame member 131 and card latch 48 may or may not be removed from upper frame member 131 during assembly of the dual-sided smart card reader 110.

Frame member 131, 129 includes spaced apart side rails 127, 133, front rail 139 and rear rail 141 extending between side rails 127, 133, cross member 143 extending between front rail 139 and rear rail 141 and card supporting rail 145 extending between side rail 127 and cross member 143. Each side rail 127, 133 is formed to include two mounting holes 142, a coupling peg 137, a coupling hole 135, an aperture, and a snap-mount leg 28. Coupling holes 135 provide a connection site for coupling pegs 137 of the opposite frame component of dual-sided smart card reader 120 for both upper and lower frame components 131, 129. Extending into aperture on side rail 133 is a cantilevered card latch 48 designed to flex during insertion of a smart card and frictionally engage smart card 12 to secure the smart card 12 in the smart card holder 110. Since it is only necessary to have one card latch 48 engage a smart card 12, card latch 48 may be removed from aperture in side rail 133 of upper frame 131 during assembly of dual-sided smart card reader 110, as shown for example, in FIGS. 18–20.

Coupling peg 137 on side rail 127 is displaced from the front rail 139 by the same displacement as coupling hole 135 on side rail 133. Coupling peg 137 on side rail 133 is likewise displaced from front rail 139 by the same displacement as coupling hole 135 on side rail 127. Therefore, when one frame member 131, 129 is inverted with respect to the other frame member 129, 131 coupling peg 137 on side rail 127 is received in coupling hole 135 on side rail 133 and coupling peg 137 on side rail 133 is received in coupling hole 135 on side rail 127. Like a rivet, coupling pegs 137 are heat deformed after they have been received in coupling holes 135 to couple upper frame member 131 to lower frame member 129. Mounting holes 142 provide a connection site for mounting pegs 136 of double-thickness smart card reader 120 when dual-sided smart card reader 110 and double-thickness smart card reader 120 are utilized in the stacked configuration 108. Snap-mount legs 28 provide for secure attachment of dual-sided smart card reader 110 to printed circuit boards 116 and 106 respectively as shown for example, in FIG. 14.

As best seen in FIG. 20, outside edge of side rails 133 extends upwardly beyond upper surface 154 of front rail 139, top surface 156 of card supporting rail 145 and top surface 158 of cross number 143. An inclined surface 160 is formed on the front portion of front rail 139. Front rail 139 is also formed to include a longitudinally extending top surface 154. Front edge of card supporting rail 145 may also include an inclined surface (not shown). Top surface 168 of back rail 141 is formed to include upwardly extending stops 166 abutting side rails 127, 133.

When upper frame member 131 is coupled to lower frame member 129, top surfaces 154, 156, 158 define a smart card-receiving insertion slot 150, as shown, for example, in FIGS. 18–20. Inclined surfaces 160 of front rails 139 act as guide ramps to facilitate insertion of smart card 12 into insertion slot 150. As smart card 12 is inserted into insertion slot 150, the leading edge of smart card 12 rides over top surface 154 of front rail 139 and slides between contacts 22 attached to top frame member 131 and contacts 22 attached bottom frame member 129.

Prior to the leading edge of smart card 12 reaching card supporting rail 145, smart card 12 may become slightly misaligned. An inclined surface (not shown) of card supporting rail 145 may act to realign leading edge of smart card 12 to facilitate complete insertion of smart card 12 into insertion slot 150. When the leading edge of smart card 12 reaches stops 166 on the rear rail 141, insertion is complete.

Front rail 139 and rear rail 141 are formed to include contact receiving grooves or mounting notches 44 in which signal contacts 22 are received. Signal contacts 22 mounted to lower frame component 129 of frame 130 of dual-sided smart card reader 110 provide an electrical path between contacts 14 of card 12 and printed circuit board 116 to which reader 110 is mounted if smart card 110 is inserted with contact side down. Signal contacts 22 mounted to upper frame component 131 of frame 130 of dual-sided smart card reader 110 provide an electrical path between contacts of card 12 and printed circuit board 106 to which reader 110 is mounted if smart card 12 is inserted with contact side up.

Rear rail 141 is formed to include switch contact receiving channels to receive mounting ends of switch contacts 174 and 176 of switch 118. Stamped and formed insertion indicator switch 118 is mounted to the rear rail 141 of lower frame member 129 of dual-sided smart card reader 110 in such a manner that switch contacts 174 and 176 will be opened by smart card 12 when smart card 12 is fully inserted into reader 110. Switch mounting section 173 is formed in rear rail 141 of lower and upper frame members 129, 131 to provide an upper mounting notch 175 and a lower mounting notch 177 providing mounting locations for fixed contact 174 and moving contact 176 respectively of insertion indicator switch 118. During assembly of the dual-sided smart card reader 110, switch contacts 174 and 176 are mounted in channels on rear rail 141 of lower frame member 129 only. The description of the operation of insertion indicator switch 118 will be described with regard to smart card reader 210 hereafter. Signal contacts 22 are received in notches 44 on both front rail 139 and rear rail 141 of upper frame member 131 and lower frame member 129.

For dual-sided operation, a smart card 12 having contacts 14 on a first side and an oppositely facing second side having no contacts is used with dual-sided reader 110. Contacts 22 on lower frame member 129 are arranged to apply a normal force to smart card 12 when it is inserted into reader 110 and to electrically couple with the contacts of smart card 12 when smart card 12 is inserted so that contact side is down. Contacts 22 on upper frame component 131 are arranged to apply a normal force to smart card 12 when it is inserted into reader 110 and to electrically couple with the contacts of smart card 12 when smart card 12 is inserted into reader 110 so that the contact side is up. Thus, contacts 22 of lower frame component 129 bias the contacts of smart card 12 into engagement with contacts 22 of upper frame component 131 when smart card 12 is inserted into reader 110 so that the contact side is up. Likewise, contacts 22 of upper frame component 131 bias the contacts 14 of smart card 12 into engagement with contacts 22 of lower frame component 129 when smart card 12 is inserted so that contact side is down.

Referring to FIG. 21–24 double-thickness smart card reader 120 is shown to comprise a one-piece frame 132, eight signal contacts 22, and a biasing element 157. Frame 132 is formed of nonconductive material such as Makrolon 9425. Frame 132 is somewhat similar to frame members 131, 129, but does not include mounting holes 42, coupling holes 135, or coupling pegs 137. Instead, frame 132 is formed to include four mounting peg bases 134, four mounting pegs 136, a bridge 148, inwardly extending side portions 169, and a protrusion 155. Peg bases 134 provide for support of printed circuit board 116 to which dual-sided card reader 110 is mounted when dual-sided reader 110 and double-thickness reader 120 are used in a stacked configuration 108. (Refer to FIGS. 14–17)

Referring again to FIG. 21–24, double-thickness reader 120 of double stacked smart card reader 108 is shown. In the context of this invention, double-thickness means that smart card reader 120 is able to read the information from either a standard thickness smart card 12 or from a double-thickness smart card (not shown). Double-thickness smart card reader 120 is not dual-sided.

Double-thickness smart card reader 120 includes a single unitary frame 132 so electrical contacts 22 are present only on lower front and rear rails 139, 141. Upper portions of frame 132 that help to define double-thickness card slot 151 include inwardly extending side portions 169 extending from opposite sides of frame 132 and cantilevered biasing element 157 extending forwardly from the rear of frame 132. A normal force is exerted by biasing element 157 opposing the force exerted on the smart card 12 by contacts 22.

Biasing element 157 includes a flexible protrusion 155 and a metal spring 122. Protrusion 155 extends inwardly from rear rail 141 of frame 132 and projects downwardly adjacent curved contact surfaces of signal contacts 22. Flexible protrusion 155 is molded as a portion of one-piece frame 132 of reader 120. Protrusion 155 has a convex lower surface 153 to facilitate engagement of non-contact carrying surface of a single or double-thickness smart card. Spring 122 is mounted by stitching at a first end 147 to bridge 148 and includes a cantilevered arm 149 coupled to protrusion 155. Biasing element 158 controls the normal forces exerted by protrusion 155 on card 12 to urge contacts 14 into engagement with electrical contacts 22. Illustratively, mechanical spring 122 is formed from spring steel. Alternatively, biasing element 157 may include a plurality, such as ten, mechanical springs 48, or a single spring element, to control the normal forces on electrical contacts 22.

Signal contacts 22 are mounted to front and rear rails 139, 141 of frame 132, and provide an electrical path between contacts 14 of card 12 and the printed circuit board to which reader 120 is mounted. Curved connection surfaces 24 of contacts 22 provide for a low coefficient of sliding friction with card 12 during insertion and removal, and also for reliable electrical coupling with card 12 during operation. Stamped and formed insertion indicator switch 118 is mounted at the rear of frame 132 in such a manner that normally closed switch contacts 174, 176 will be opened by smart card 12 when smart card 12 is fully inserted into reader 12.

Frame 132 of double-thickness smart card reader 120 is formed to include two snap-mount legs 28, two spacer posts 29, mounting peg bases 134, and mounting pegs 136 Mounting pegs 136 extend through printed circuit card 116 and into mounting holes 42 of frame members 131, 129 of dual-sided smart card reader 110.

Signal contacts 22 of the double-thickness smart card reader 120 are connected directly to the mainboard (not shown) of the customer. The solder tails 26 of the electrical contacts 22 are soldered directly on the mainboard (not shown)of the customer. Biasing element 157 is present to apply a mechanical force on an inserted smart card 12. The total force of biasing element 157 is higher than the total force of the eight electrical contacts 22, resulting in a net force in the direction of the electrical contacts 22. The displacement of the electrical contacts 22 is limited by frame 132 allowing the normal force to be the same independent of the thickness of the smart card.

Switch mounting section 173 is formed in rear rail of frame 132 to provide an upper mounting notch 175 and a lower mounting notch 177 providing mounting locations for fixed contact 174 and moving contact 176 respectively of insertion indicator switch 118.

Figure 24:
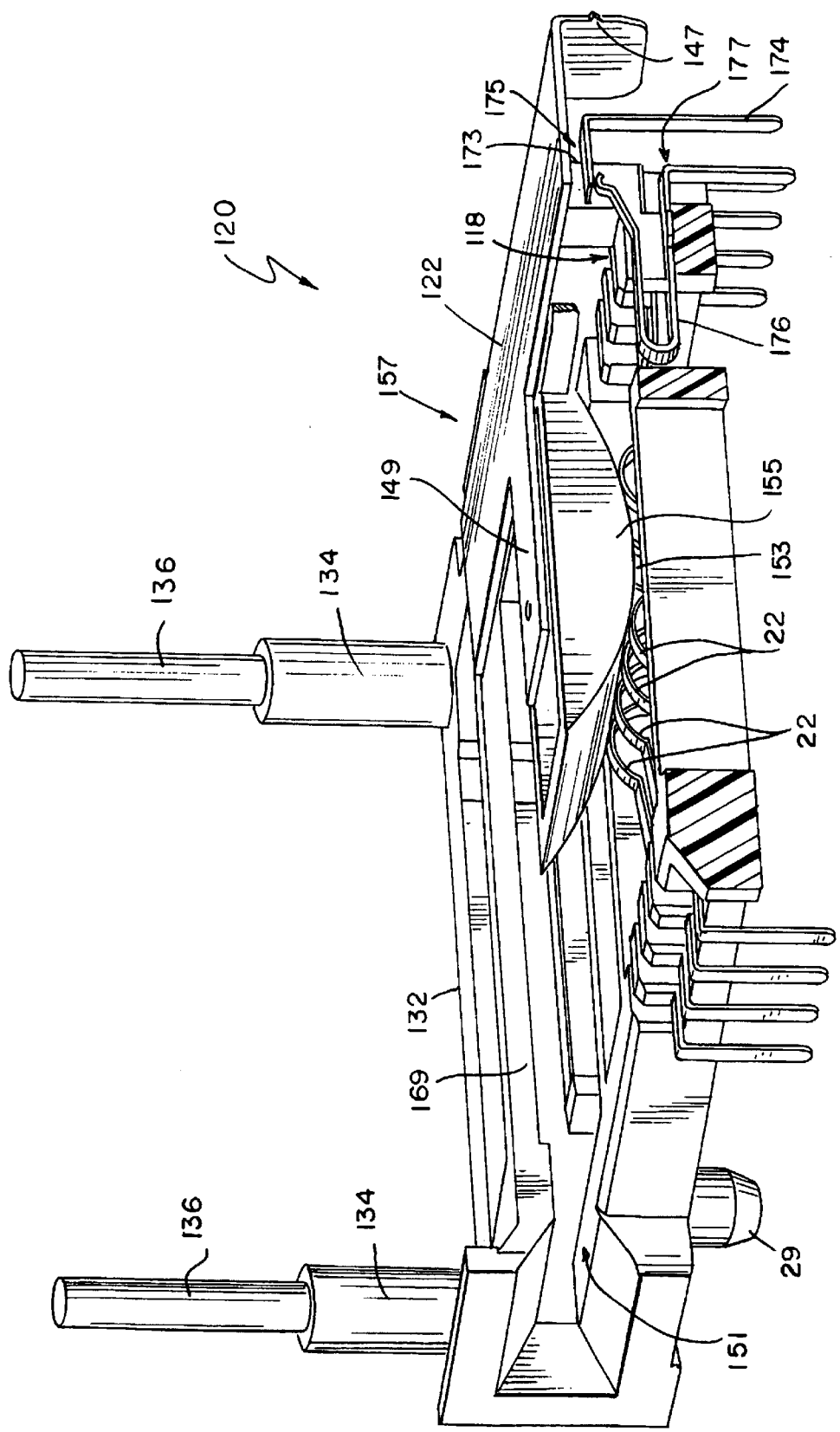
FIG. 24 is a perspective view with parts broken away of the double-thickness smart card reader of FIG. 21.
Figure 25:
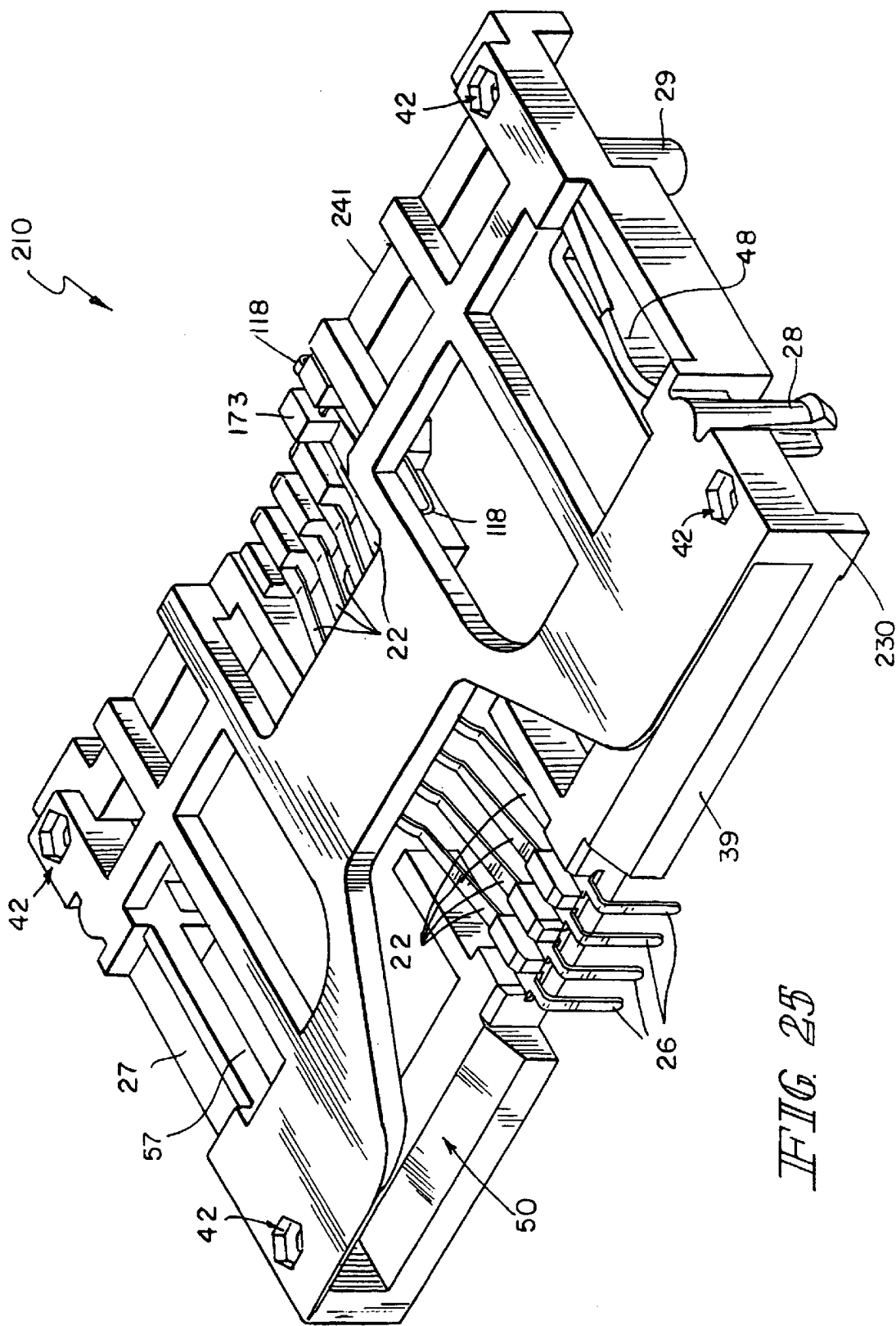
FIG. 25 is a top perspective view of a one-piece frame smart card reader having a novel insertion detection switch for use in stand alone or stacked configurations.
Figure 26:
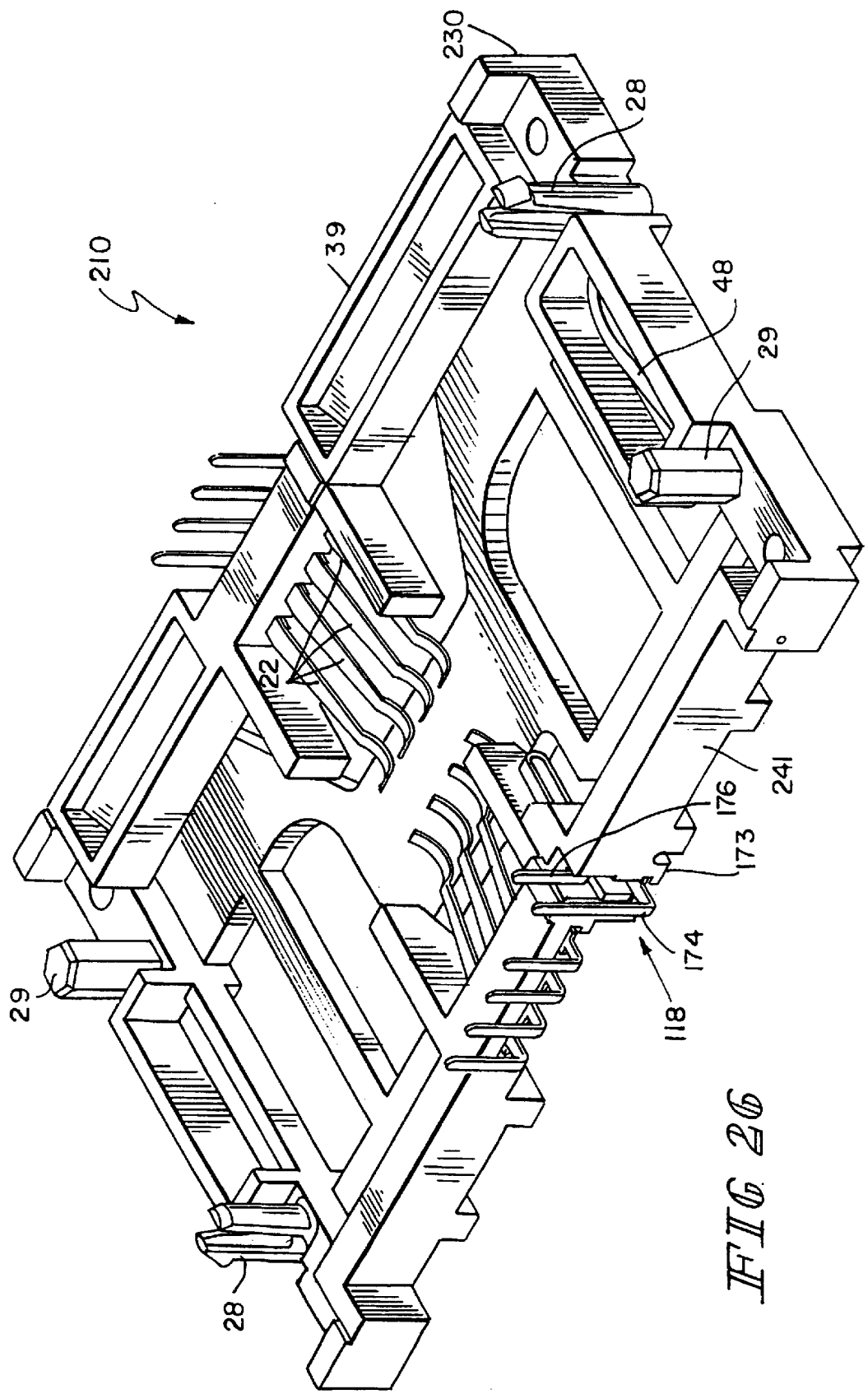
FIG. 26 is a bottom perspective view of the reader of FIG. 25.
Figure 27:
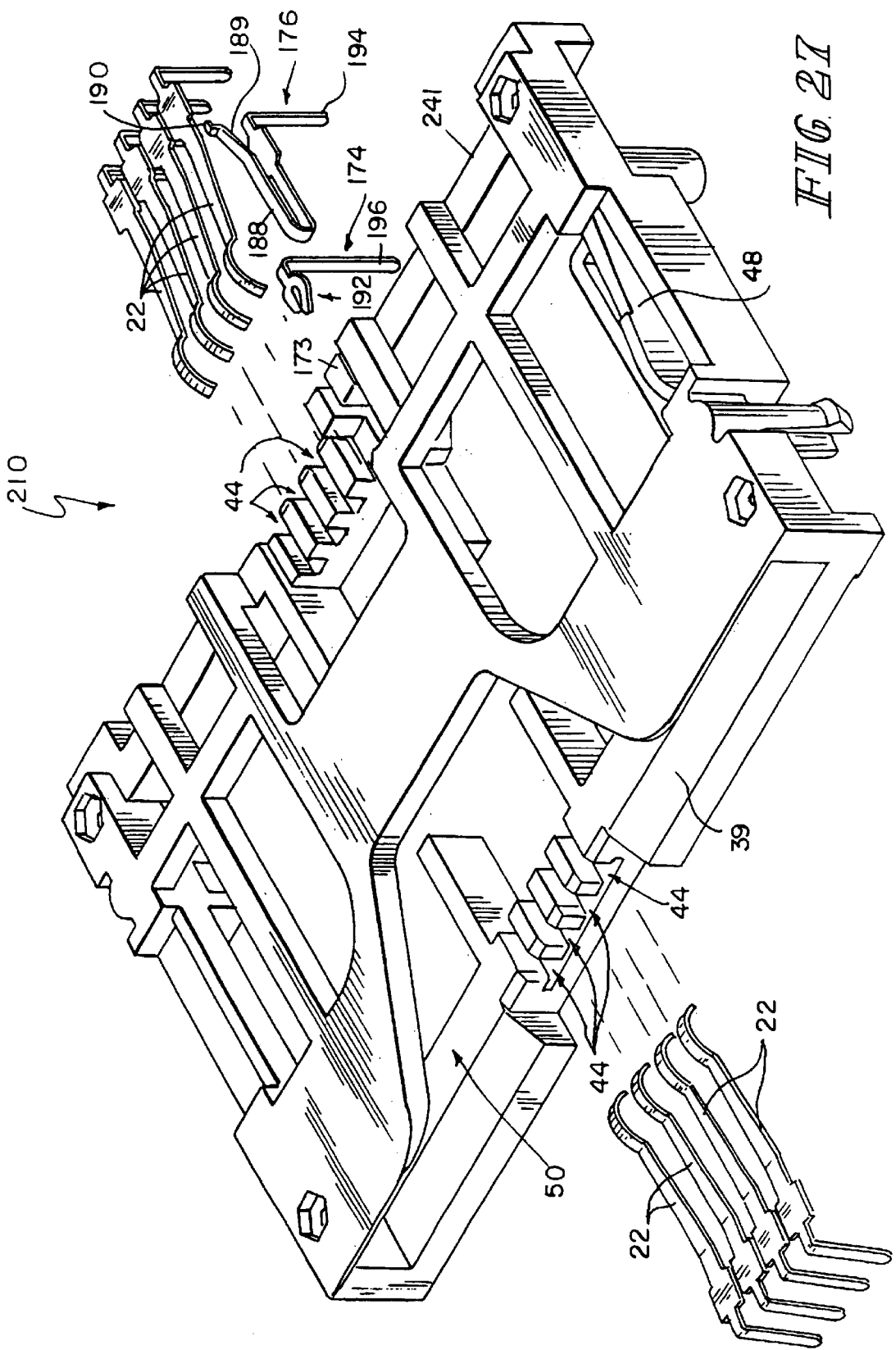
FIG. 27 is an exploded view of the reader of FIG. 25.

Referring to FIG. 24, the construction of insertion indicator switch 118 used in dual-sided smart card reader 110, double-thickness smart card reader 120, and one-piece frame smart card reader 210, is shown in detail. Since similar reference numerals are used for similar components of dual-sided smart card reader 110 and double-thickness smart card reader 12, the insertion indicator switch 118 will be described with regard to one-piece frame smart card reader 210 hereafter, it being understood that such description applies to the other readers using insertion indicator switch 118.

FIGS. 25–28 illustrates a one-piece frame smart card reader 210 of the present invention, which is utilized as either the top smart card reader in a double (or stacked) configuration, or as the stand alone smart card reader in a single configuration. Smart card reader 210 is very similar to smart card 10 except that back rail 241 of smart card 210 is configured to receive insertion indicator switch 118 while back rail 41 of reader 10 is configured to receive insertion indicator switch 18. Each of the configurations of smart card readers 10, 20, 110, 120, 210 disclosed in the application have certain identical and certain similar components. Identical reference numerals have been, and will be, used to identify identical components and similar reference numerals have been, and will be, used to identify similar components.

Reader 210 comprises frame 230, signal contacts 22, and stamped and formed insertion indicator switch 118. Frame 230 is a single piece of formed nonconductive material to which the other components are mounted. Frame 230 is formed with four mounting holes 42, two snap-mount legs 28 and two spacer posts 29. Mounting holes 42 provide a connection site for mounting pegs 36, 136 of lower smart card reader 20, 120 when smart card reader 210 and lower reader 20, 120 are utilized in a stacked configuration. Legs 28 provide for secure attachment of reader 210 to the printed circuit board to which reader 210 is mounted. Signal contacts 22 are mounted in lower front rail 39 and lower rear rail 241 of frame 230, and provide an electrical path between contacts of card 12 and the printed circuit board to which reader 210 is mounted. Stamped and formed insertion indicator switch 118 is mounted in rear rail 241 of frame 230 in such a manner that fixed switch contact 174 and moving switch contact 176 will be activated by smart card 12 when smart card 12 is fully inserted into reader 210. (Refer to FIGS. 29–31.)

Contact mounting notches 44 are formed in front and rear rails 39, 241 of frame 230 to provide a mounting location for signal contacts 22. Switch mounting section 173 is formed in frame 230 to provide an upper mounting notch 175 and a lower mounting notch 177 providing mounting locations for fixed contact 174 and moving contact 176 respectively of insertion indicator switch 118. Spring card latch 48 is formed in frame 230 and provides a coefficient of friction that is sufficient to prevent card 12 from being removed unintentionally from reader 210. Spring card latch 48 provides this coefficient of friction by exerting force on card 12 tangentially to the direction of movement of card 12 in card slot 50. This force creates friction between card 12 and spring card latch 48, and also between card 12 and the vertical interior surface 57 of side rail 27 of card slot 50 that is opposite spring card latch 48.

Card slot 50 is a space provided for smart card 12, which is defined by a plurality of surfaces. The portions of frame 230 that define card slot 50 are slot top section 58, slot bottom section 62, left vertical side wall 57 of side rail 27, slot rear section 52 and right vertical wall 59 of side rail 33. Top section 58 comprises contact face 56 and guide ramp face 60. Guide ramp face 60 provides for guidance of card 12 into slot 50 during initial insertion of card 12. Contact face 56 provides limitation against movement in the upward direction of card 12 and exerts a force normal to the top surface of card 12 opposite the force exerted by spring loaded signal contacts 22 on the bottom surface of card 12, thereby retaining card contacts 14 in engagement with signal contacts 22 of reader 10.

Bottom section 62 of card slot 50 comprises contact face 66 and guide ramp face 64. Guide ramp face 64 provides for guidance of card 12 into slot 50 during initial insertion of card 12. Contact face 66 provides limitation against movement in the downward direction of card 12. Slot rear section 52 comprises contact face 54, which limits movement of card 12 in the direction of insertion.

Figure 28:
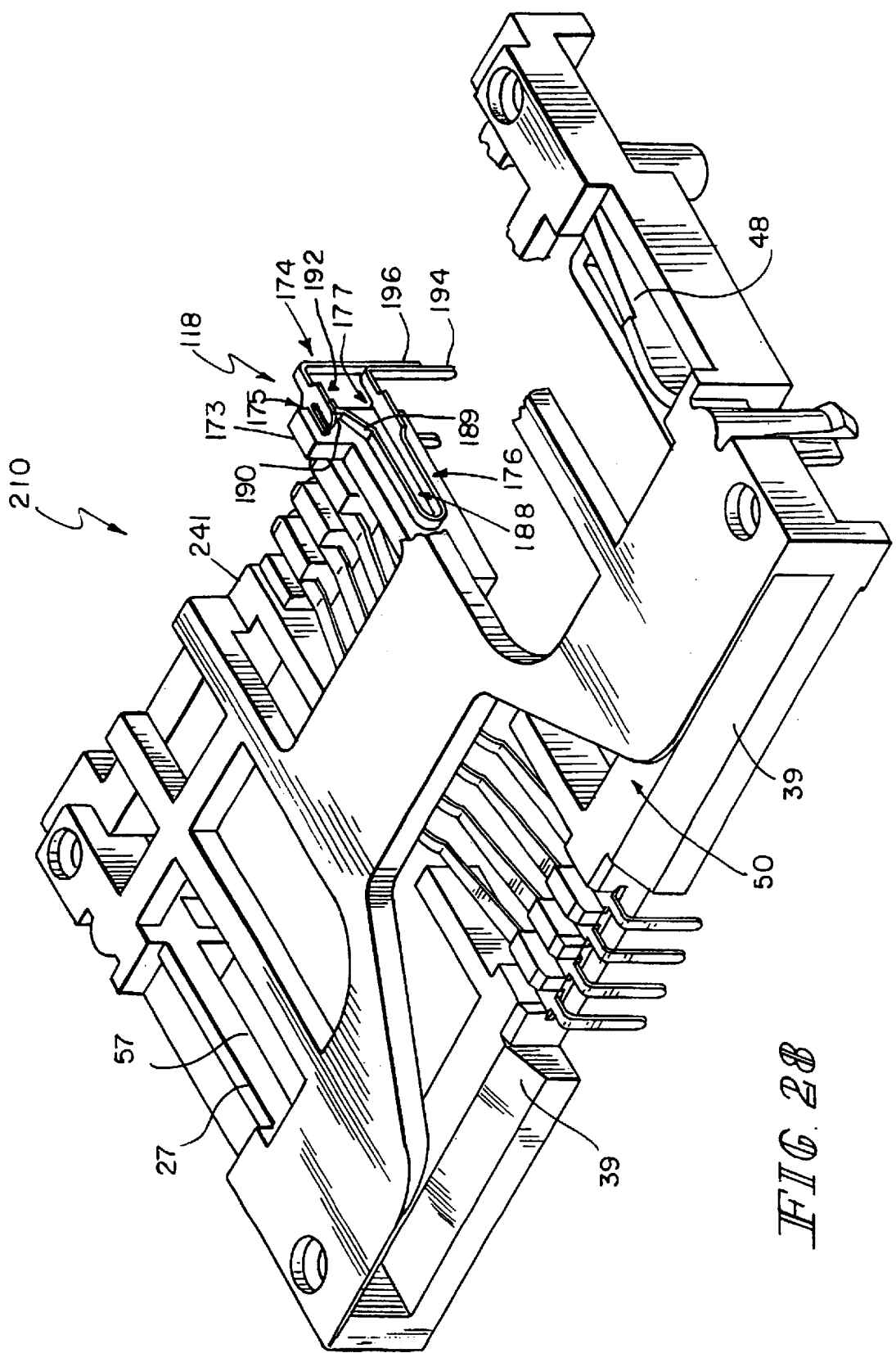
FIG. 28 is a perspective view with parts broken away of the reader of FIG. 25 to show the novel insertion detection switch.

In FIG. 28, part of the material of the frame 230 is removed, for illustration. The relationship of fixed switch contact 174 and moving switch contact 176 when they are assembled into frame 230 is shown. The downwardly facing contact area 192 of fixed switch contact 174 is positioned at the top of the reader 210 and never moves. The solder tail 196 of the fixed contact 174 is bent downward so it can be soldered to the board of the customer.

Underneath downwardly facing contact area 192 of contact 174 is upwardly facing contact point 190 of moving switch contact 176 which presses with force against the fixed switch contact 174. Upwardly facing contact area 190 is the last part of top leg 188. Top leg 188 includes a ramp section 189 engaged by smart card 12 which causes top leg 188 to bend when it is activated by the smart card 12. The solder tail 194 of moving contact 176 is bent downward so it can be soldered to the board of the customer.

Figure 29:
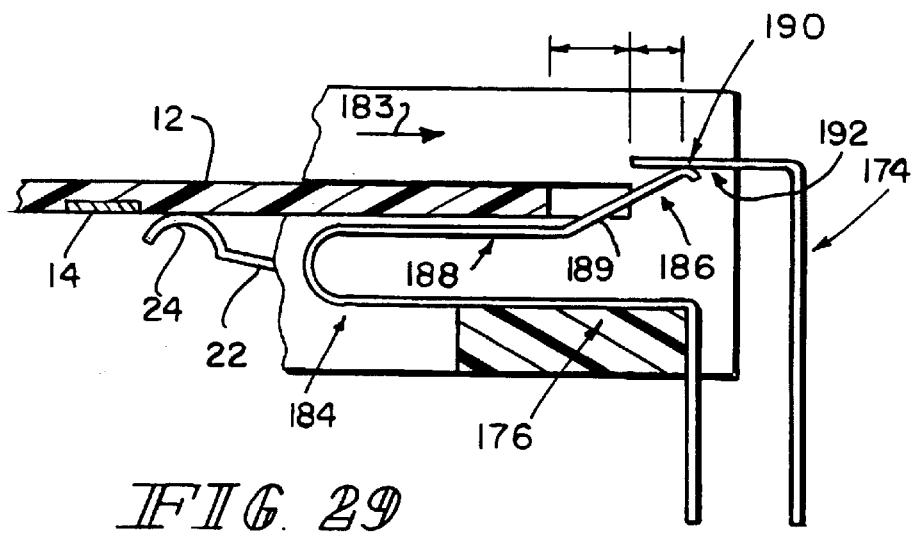
FIG. 29 is a sectional view along line 29—29 of FIG. 25 with a smart card shown partially inserted into the reader but not yet engaging the indicator detection switch.
Figure 30:
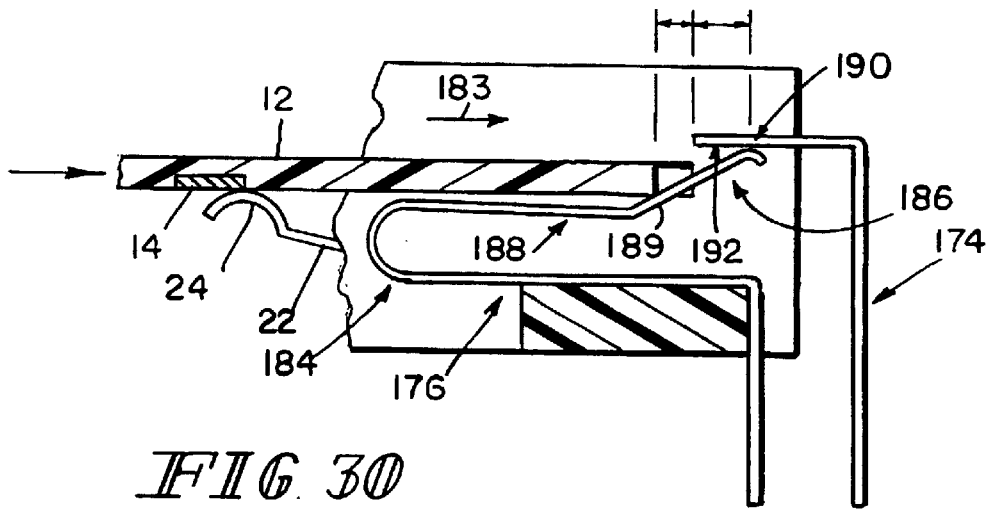
FIG. 30 is a view similar to FIG. 29 showing the smart card's leading edge contacting a ramp section of a lower contact of the switch to urge a contact portion of the lower contact rearwardly and downwardly from an upper contact.
Figure 31:
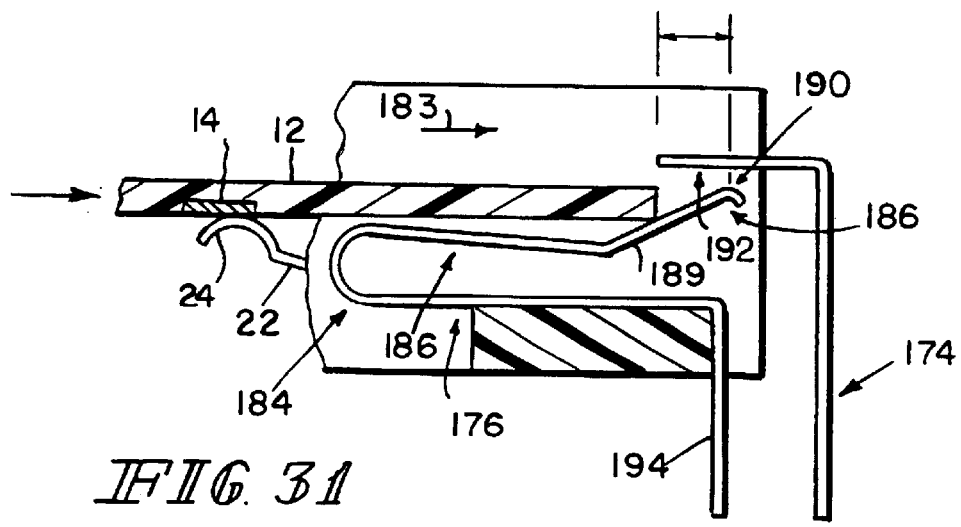
FIG. 31 is a view similar to FIG. 30 showing the smart card fully inserted into the card reader so that the leading edge of the smart card has urged the lower contact of the insertion indicator switch downwardly so that the lower contact no longer engages the upper contact.

FIGS. 29–31 illustrate an embodiment of the present invention in which a single smart card reader 210 is utilized in conjunction with a single smart card 12 and the interplay between contacts 14 of smart card 12, contacts 22 of reader 210, and the operation of insertion detection switch 118. Insertion detection switch 118 operates similarly with smart card 12 and contacts 22 in each reader 110, 120, 210 in which such a switch 118 is incorporated.

In FIG. 29 the smart card 12 has entered smart card reader 210 up until the signal contacts 22 are about to be activated by engagement of contacts 14 of smart card 12. Signal contacts 22 are sliding across the surface of the smart card 12. The detection switch 118 is in its normal closed state and awaiting smart card 12 to activate it. The top switch contact 174 is the fixed switch and will always stay in position. The bottom switch contact 176 is the moving switch and is bent to form a substantially U-shaped portion 184 which acts as a spring. The distal end portion 186 of the U-shaped portion 184 is bent upward to form ramp section 189 and a contact point 190 which in its normal closed state presses against the fixed switch contact 174.

In FIG. 30, the smart card 12 is moved farther still into the smart card reader 110 so that curved connection sections 24 of contacts 22 are engaging card contacts 14 of smart card 12. The leading edge of the smart card 12 is now pressing against ramp section 189 of the distal end portion 186 of the moving switch contact 176 and thus is forcing contact point 190 of moving switch contact 176 rearwardly in the direction 183 of insertion of smart card 12 and downwardly perpendicular to the direction of insertion of smart card 12. The rearward movement of moving switch contact 176 induces contact point 190 of moving contact 176 to wipe across contact surface 192 of non-moving contact 174. This wiping action provides a self cleaning aspect to switch 118. The downward movement of moving switch contact 176 induces opening of the contact formed between moving switch contact 176 and fixed switch contact 174. The top leg 188 of the U-shaped portion 184 is bent downward and therefore the contact-point 190 of the moving switch contact 176 is also moving downwardly. The switch 128 is opening at this stage.

In FIG. 31 the smart card 12 has been fully inserted into smart card reader 210. The top leg 188 of the U-shaped portion 184 of moving switch contact 176 is pressed further downward and the switch 118 is now fully opened. Upwardly facing contact point 190 is now displaced vertically downwardly from downwardly facing contact surface 192 of fixed switch contact 174. During the opening of the switch 118 the card 12 has moved about 0.5–1.0 mm. This is to compensate for the tolerances in the reader 210 and to provide the wiping action. This distance is the same as it is in existing smart card readers. When card 12 is fully inserted into reader 210, normally closed un-sealed insertion indicator switch 118 is opened by the leading edge of card 12. The activation of insertion indicator switch 118 provides an indication to the equipment into which reader 210 is installed that smart card contacts 14 are electrically connected to signal contacts 22.

The two switch contacts 174, 176 are stamped and formed and will be supplied on separate carriers (not shown). The contacts 174, 176 are assembled by first cutting loose one piece of the contact and then inserting them into frame 230. Then the solder tails 194, 196 of the contacts are bent into position. First the moving detection contact 176 is assembled into frame 230 and then the fixed detection contact 174 is assembled. The basic assembly of the contacts 174, 176 is thus the same as the signal contacts 22.

In each of the stacked configurations 8, 108 of smart card readers described so far herein, the upper smart card reader 10, 110 has been electrically coupled through a PCB 16, 16, 106 to the motherboard or main board of the system in which the stacked configuration is attached. It is to be understood however that alternative methods of electrically coupling an upper smart card reader 310, 410 (including readers 10, 110, 210 as well as other readers) in a stacked configuration 308, 408 (including stacked configuration 8, 108) with a lower smart card reader 320, 420 (including readers 20, 120 as well as other readers) is within the scope of the invention.

Figure 32:
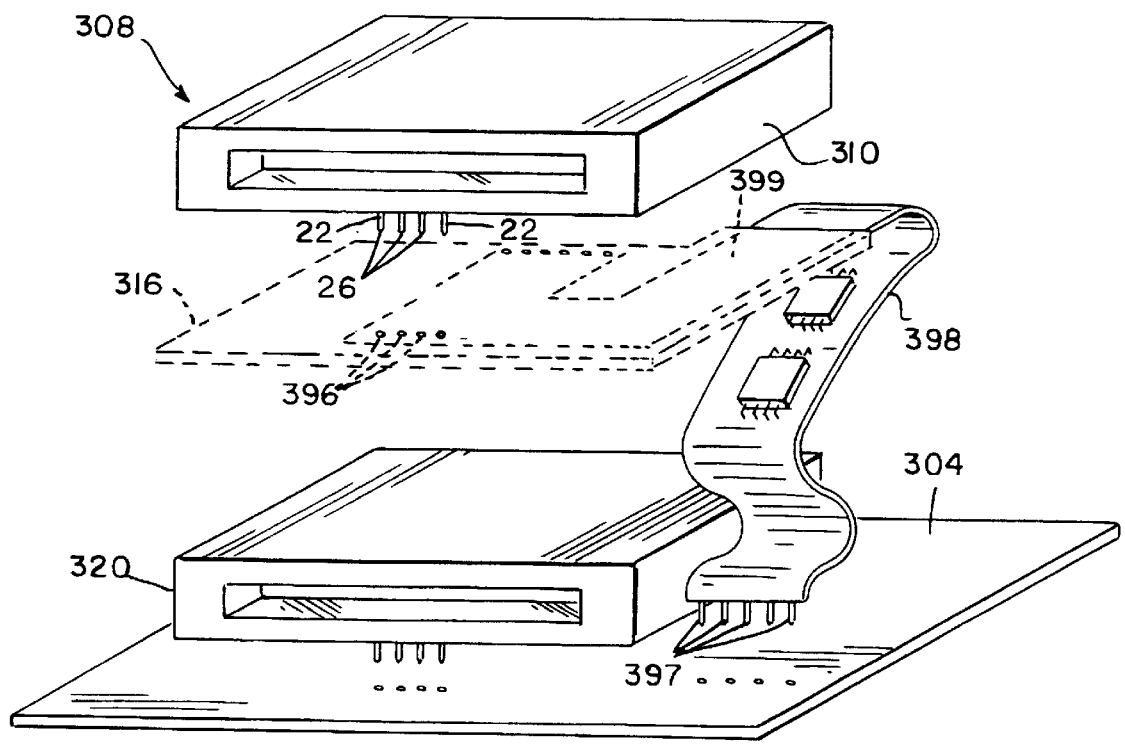
FIG. 32 is a diagrammatic view of a stacked smart card configuration showing an upper reader, a lower reader, a PCB sandwiched between the upper and lower readers, a main PCB coupled to the lower reader and a flexible foil strip with active electronic components thereon coupling the upper reader to the main PCB.
Figure 33:
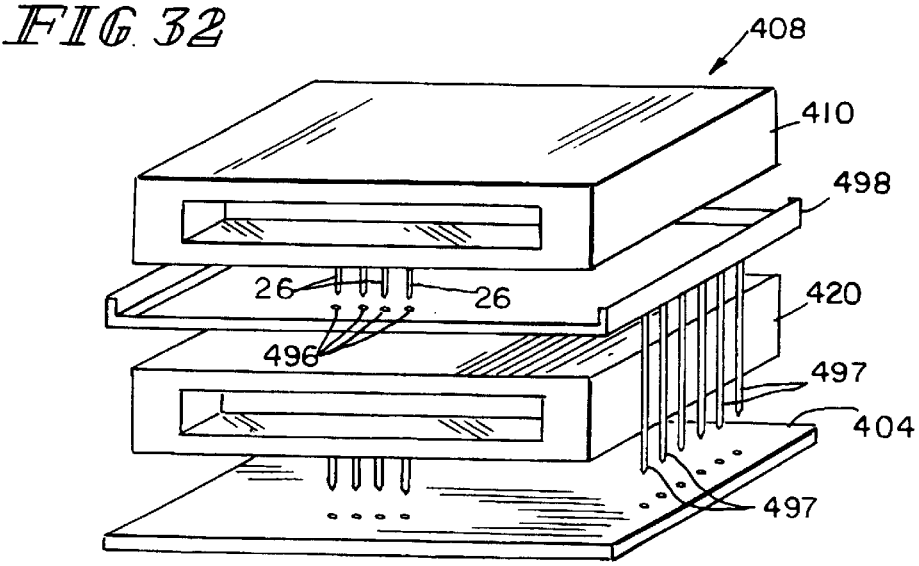
FIG. 33 is a diagrammatic view of a stacked smart card configuration showing an upper reader coupled mechanically and electrically to a lead frame, a lower reader electrically and mechanically coupled to a main PCB and leads from the lead frame electrically coupling the upper reader to the main PCB.

As shown, for example in FIG. 32, top reader 310 may be electrically coupled to motherboard 304 by a flexible foil ribbon 398. Flexible foil ribbon 398 includes traces (not shown) coupling leaders 397 to electronic components 82 on the flexible foil. Flexible foil 398 is illustratively coupled to PCB 316 which is coupled to tails 26 of signal contacts 22 of upper reader 310. Alternatively, as shown for example, in phantom lines in FIG. 32, flexible foil 398 may include a section 399 having contact vias 396 formed therein for directly coupling to tails 26 of signal contacts and leaders of switches allowing PCB 316 to be discarded. It is also within the teaching of the invention for flexible foil 398 to be used without electronic components 82.

Yet another alternative structure for coupling top reader 310 in a stacked configuration 308 is a lead frame 498. Top reader 410 may be electrically coupled to motherboard 404 by lead frame 498 which illustratively is a one-piece stamped and formed frame. Lead frame 498 includes traces (not shown) coupling leaders 497 to electronic components (not shown) carried on the lead frame 498. Lead frame 498 includes front and rear rails having contact vias 496 formed therein for directly coupling to tails 26 of signal contacts and leaders of switches.

Figure 34:
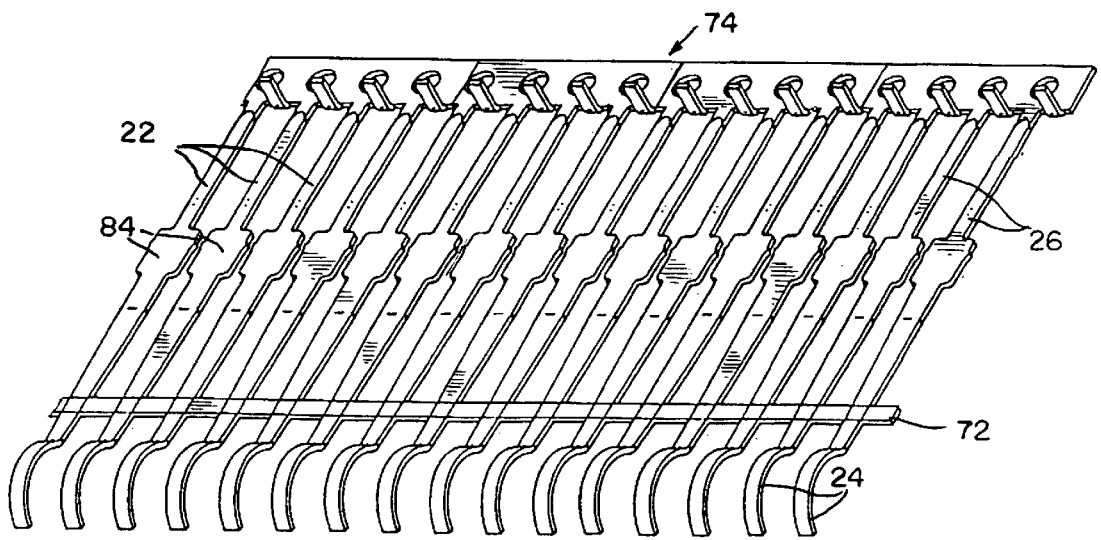
FIG. 34 is a perspective view of signal contacts held on a removable strip in a spaced apart configuration corresponding to the spacing of signal contacts mounted to a card reader frame.
Figure 10:
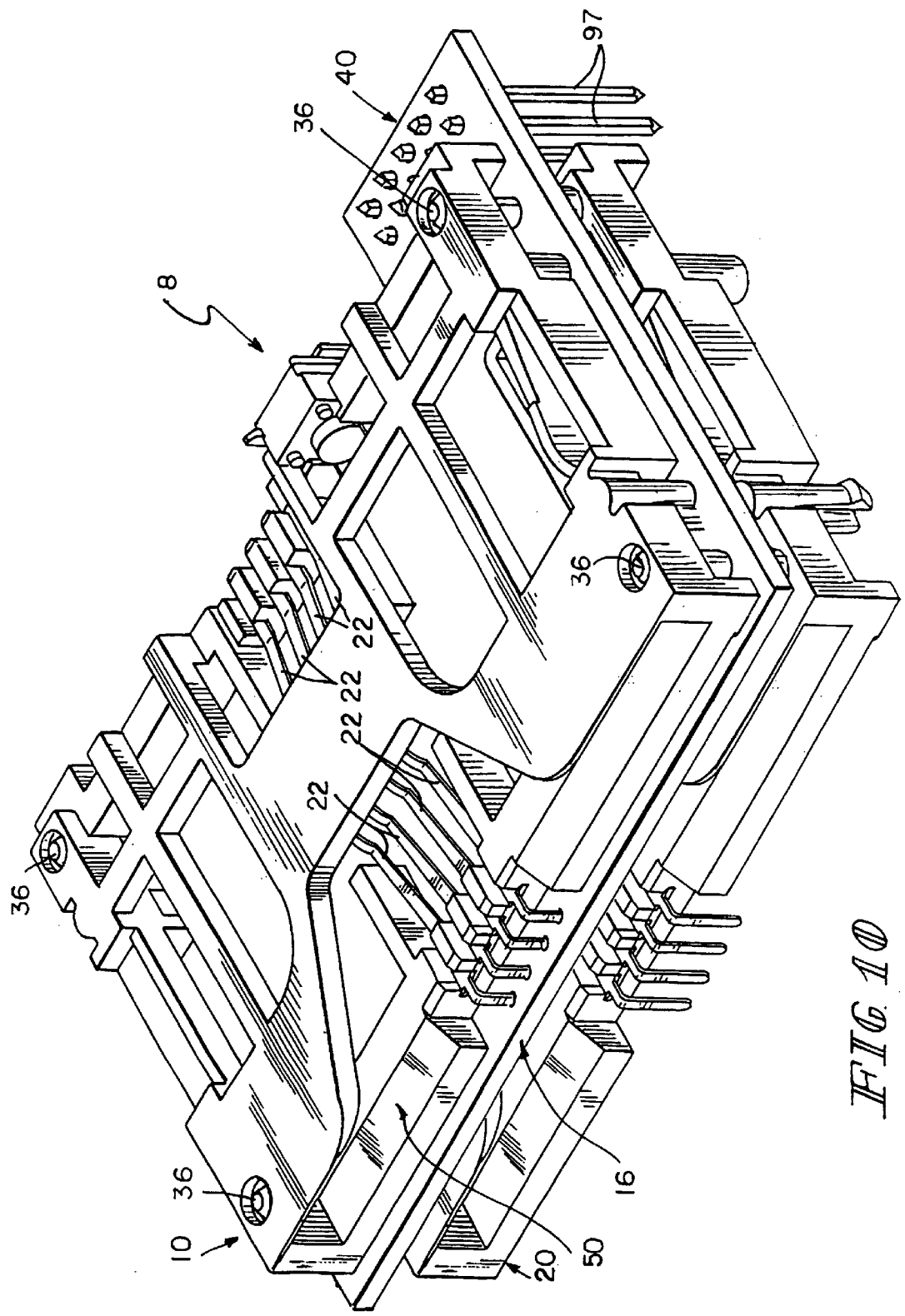
FIG. 10 is a top perspective view of the smart card readers of FIGS. 1–4 and 5–7 in a stacked configuration with a printed circuit board having active components thereon sandwiched between the readers.
Figure 11:
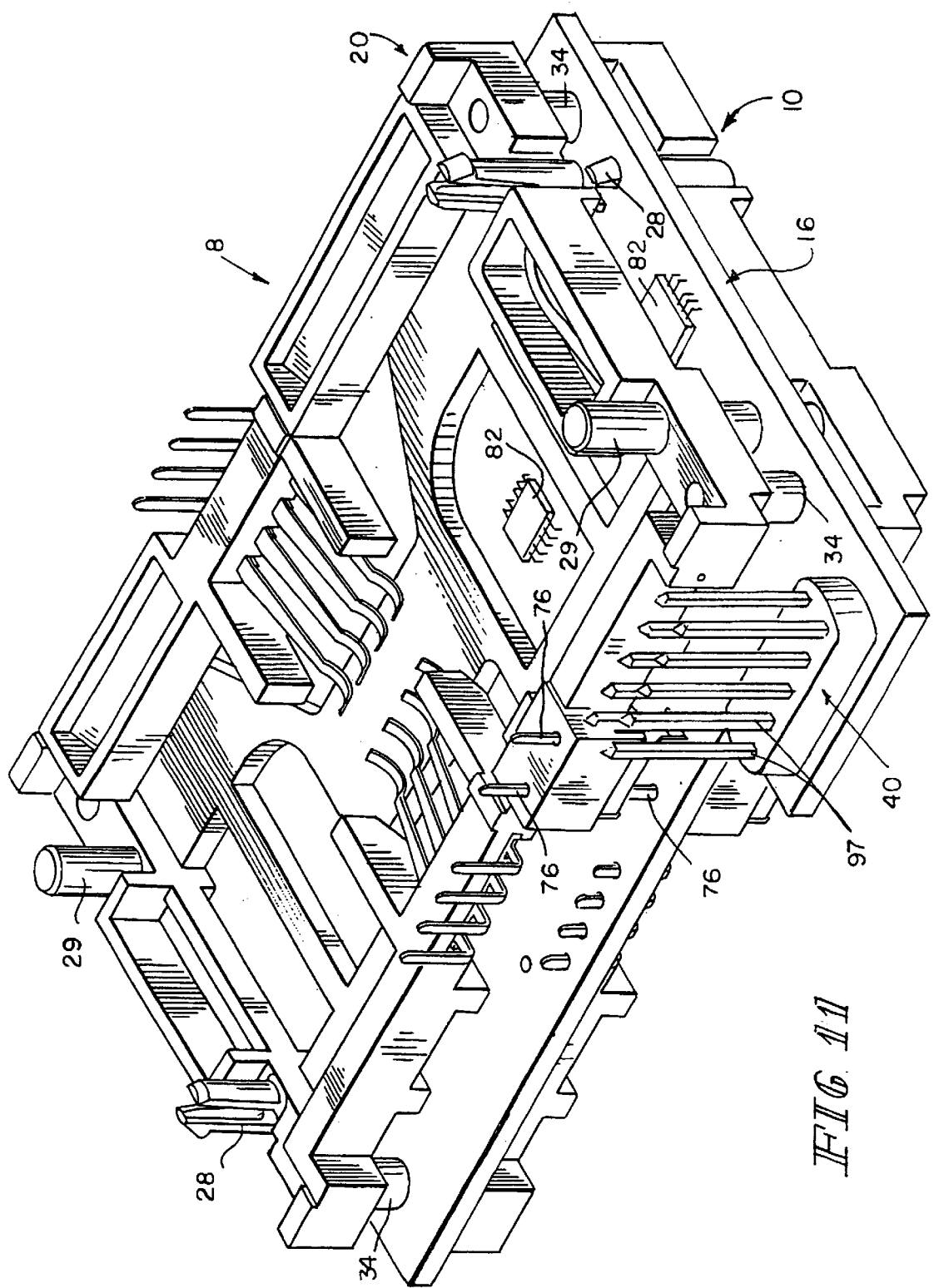
FIG. 11 is a bottom perspective view of the stacked smart card readers of FIG. 10.

FIG. 34 is a perspective view of signal contacts 22 of the present invention prior to insertion of contacts 22 into frame 30, 32, 130, 132, 230. Front support section 72 is removed prior to coupling of contacts 22 to frame 30, 32, 130, 132, 230. Rear insertion support section 74 maintains the alignment of contacts 22 during the manufacturing process, and is removed after contacts 22 have been inserted into frames 30, 32, 130, 132, 230. Retention tab section 84 of contact 22 is inserted into contact mounting notch 44 of frame 30, 32, 130, 132, 230 during assembly. Tail 26 of each contact 22 is bent during the assembly process in such a manner as to form approximately a ninety degree angle with the remaining portion of contact 22. In this manner, tail 26 becomes the electrical leader of contact 22, and is the portion of contact 22 that is soldered to the circuit board to which reader 10, 20, 110, 120, 210 is mounted. Curved connection surfaces 24 of contacts 22 provide for a low coefficient of sliding friction with card 12 during insertion and removal, and also for reliable electrical coupling with card 12 during operation. During mounting, spring contact is positioned to be spring loaded so that curved contact surface 24 is biased upwardly to exert a force on the bottom surface (and eventually on card contacts 14) of card 12 being inserted into reader 10, 20, 110, 120, 210.

Figure 35:
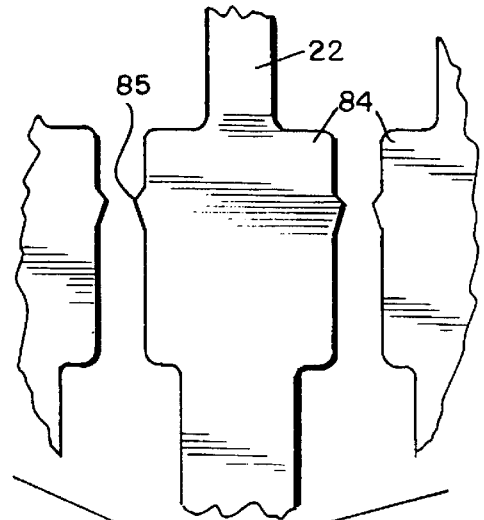
FIG. 35 is a magnified view of Area 35—35 of FIG. 34.

As shown, for example, in FIG. 35, retention tab section 84 of signal contacts 22 is shaped for insertion into contact mounting notch 44 of upper and lower card readers 10 and 20. Retention tab section 84 of contact 22 is inserted into contact mounting notch 44 of frame 30 or 32 during assembly. Retention barb 85 of contact 22 is formed so that it allows retention tab 84 to be inserted into, but not removed from, notch 44 of frame 30 or 32. In this manner, barb 85 secures retention tab section 84 to frame 30 or 32.

Embodiments of the present invention addresses the height problem of conventional smart card readers by integrating the contact element support and the frame. Because the contact elements are mounted directly to the frame of the reader, there is no need for a separate contact element support apparatus, and therefore no need to allow for vertical motion. Furthermore, because there is no separate contact element support, there is no requirement for a spring means to move such a support from the reading to the initial position as there is in the conventional smart card reader.

The present invention addresses the low mean time between failures problem of conventional smart card readers by eliminating the contact element support and the moving parts associated thereunto. This is accomplished by mounting the contact elements directly to the frame of the reader. Therefore, the only movement of parts in the present invention is the spring action of the contact elements when a card is inserted or removed, and the opening and closing of the switch that is activated by a fully inserted card. Because of the very limited motion of the contact elements of the present invention, and because of the extremely high mean time between failures of the sealed switch assembly used in the present invention, the present invention will last longer than any device into which it is likely to be integrated.

The present invention addresses the complex manufacturing process associated with conventional smart card readers by integrating the contact support with the frame. Because all components of the smart card reader are mounted directly to the frame, the complexity of the manufacturing process is reduced. Furthermore, the contacts are mounted to the frame as a group and conformed to it as a group, thereby further simplifying the manufacturing process.

The present invention addresses the problem of printed circuit board real estate consumption associated with conventional stacked configuration smart card readers by allowing electrical components to be mounted to the printed circuit board that is positioned between the upper and the lower smart card readers. The present invention allows for the use of the real estate on this printed circuit board by spacing this printed circuit board between the upper and lower smart card readers so as to provide enough clearance for the mounting of electrical components thereon. Because of this design, there is almost no net real estate consumption on either the component side or the trace side of the printed circuit board to which the stacked readers of the present invention are mounted.

Although the invention has been described in detail with reference to a certain preferred embodiment, variations and modifications exist within the scope and spirit of the present invention as described and defined in the following claims.

What is claimed is:

1. A card reader of the type for receiving a smart card having leading and trailing edges joined by sides and laterally and longitudinally spaced card contacts on a contact surface, the card reader comprising:

a molded, one-piece frame providing an insertion opening having opposite sides for slidably receiving such a smart card, a plurality of reader contacts for engaging the card contacts, an insertion indicator switch being positioned and configured on the reader to establish when the card is positioned such that the card contacts and reader contacts are engaged, said insertion detection switch comprising a top switch contact and a bottom switch contact being relatively movable in the direction perpendicularly to the direction of card movement such that the leading edge of the card will move the switch contacts, and a spring element for engaging a side of such a card to urge the card against the opposite side of the opening.

2. The reader of claim 1 in which the spring element is located at one side of the reader opening.

3. The invention of claim 1 in which the insertion indicator switch is positioned to detect the presence of the leading edge of the card.

4. The invention of claim 1 in which the reader contacts comprise two sets of contacts formed and spaced apart on contact strips, the frame having correspondingly spaced apart mounting notches for receiving the contacts while they are still connected to the strip, the strip being removable to leave separate contacts mounted on the frame.

5. The invention of claim 4, the insertion opening being defined by top sections and bottom sections, the notches being formed in the bottom sections, each reader contact having a spring portion for urging such a card against the top section.

6. The invention of claim 1 comprising a second reader stacked on the first said reader with the insertion openings being in vertical alignment.

7. The invention of claim 6 comprising a printed circuit board sandwiched between the reader frames to provide contacts.

8. The invention of claim 7 in which the PCB has a portion extending beyond the reader frames and electronic components carried by the PCB.

9. The invention of claim 1 in which the reader frame is formed with snap-mount legs to engage a hole in a PCB and hold the reader to the PCB.

10. The invention of claim 1 in which the reader frame is formed with spacer posts to hold the reader relative to a PCB.

11. The invention of claim 1 in which the upper section is formed with a mounting hole in each corner.

12. The invention of claim 1 in which the upper section is formed with a mounting peg extending upwardly from each corner to be received in a corner opening of a second reader stacked on the first said reader.

13. The invention of claim 1 in which the reader is configured to read a smart card with its card contacts facing upwardly or facing downwardly, the reader having an upper set of reader contacts and a lower set of reader contacts.

14. The invention of claim 13 in which the reader frame comprises upper and lower frame components.

15. The invention of claim 14 in which the upper frame component and lower frame component are formed substantially identically so that a lower component can be turned over to serve as an upper component, the spring element being removable from one of the frame components.

16. The invention of claim 15 in which the insertion indicator switch is on one of the upper and lower frame components.

17. The invention of claim 1 in which the switch contacts extend in the direction of movement of the card in the reader, the switch contacts being relatively movable perpendicularly to the contact surface of the card.

18. The invention of claim 17 in which one of the switch contacts is formed with a ramp portion engaged by the leading edge of the card, the ramp portion being configured to move the one switch contact in the direction of the movement of the card as well as away from the other switch contact.

19. The invention of claim 1 in which the insertion opening is configured to receive a double-thickness smart card, the opening being defined by a top and bottom sections, the reader contacts being provided on the bottom section, the upper section being provided with an element for urging the card against the reader contacts.

20. The invention of claim 19 in which the element is a spring element attached to the top section, the spring element being configured to urge a single thickness card against the reader contacts.

21. The invention of claim 6 including a PCB and a flexible foil connector strip connecting one of the card readers to the PCB.

22. The invention of claim 6 comprising a PCB and a lead frame providing connection between the upper card reader and the PCB.

23. The invention of claim 7 further comprising a second PCB above the upper reader and wherein the upper reader is configured to read a smart card with its card contacts facing upwardly or facing downwardly, the reader having an upper set of reader contacts and a lower set of reader contacts.

24. The invention of claim 1 wherein the frame is formed to include a guide ramp adjacent the insertion opening.

* * * * *